(12) United States Patent
Tate et al.

(10) Patent No.: US 12,223,786 B2
(45) Date of Patent: Feb. 11, 2025

(54) GATE OPENING METHOD AND DOOR UNLOCKING METHOD USING PORTABLE TERMINAL NETWORK ADDRESS

(71) Applicant: CONNECTFREE CORPORATION, Kyoto (JP)

(72) Inventors: Kristopher Andrew Tate, Kyoto (JP); Mitsuhiro Okamoto, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 110 days.

(21) Appl. No.: 17/436,928

(22) PCT Filed: Mar. 4, 2020

(86) PCT No.: PCT/JP2020/009206
§ 371 (c)(1),
(2) Date: Sep. 7, 2021

(87) PCT Pub. No.: WO2020/184341
PCT Pub. Date: Sep. 17, 2020

(65) Prior Publication Data
US 2022/0172534 A1    Jun. 2, 2022

(30) Foreign Application Priority Data

Mar. 8, 2019   (JP) ................................ 2019-042840

(51) Int. Cl.
*G07C 9/00*     (2020.01)
*H04L 67/125*   (2022.01)

(52) U.S. Cl.
CPC ..... *G07C 9/00571* (2013.01); *G07C 9/00182* (2013.01); *H04L 67/125* (2013.01); *G07C 2009/00769* (2013.01)

(58) Field of Classification Search
CPC ............ G07C 9/00571; G07C 9/00182; G07C 2009/00769; H04L 67/125
See application file for complete search history.

(56) References Cited

U.S. PATENT DOCUMENTS 11,397,908 B2 *  7/2022  Endo ...................... G05B 15/02
2002/0152384 A1  10/2002  Shelest et al.
(Continued)

FOREIGN PATENT DOCUMENTS

CN       104134253 A     11/2014
CN       106780901 A     5/2017
(Continued)

OTHER PUBLICATIONS

Peter Wayner, Disappearing Cryptography, 2009, Elsevier, Inc., Third Edition, pp. 19-36 (Year: 2009) (Year: 2009).*
(Continued)

*Primary Examiner* — Daniell L Negron
(74) *Attorney, Agent, or Firm* — Sughrue Mion, PLLC

(57) ABSTRACT

A gate opening method includes: a step (S8) of transmitting a gate opening signal for making a request for opening of a gate, which is configured to restrict entry into a predetermined space, to the gate by using an IP address unique to a mobile terminal associated with a user; a step (S9) of determining whether or not to allow the user to enter the predetermined space based on a ticket management table and the IP address of the mobile terminal in response to reception of the gate opening signal; and a step (S11) of controlling the gate so that the user is able to enter the predetermined space in response to a determination that the user is allowed to enter the predetermined space. The ticket management table includes a plurality of pieces of network address information indicating a plurality of IP addresses unique to a plurality of mobile terminals.

11 Claims, 28 Drawing Sheets

(56) References Cited

U.S. PATENT DOCUMENTS

| | | |
|---|---|---|
| 2013/0342314 A1 | 12/2013 | Chen et al. |
| 2016/0105644 A1* | 4/2016 | Smith .............. G08B 13/19667 |
| | | 348/159 |
| 2019/0034859 A1* | 1/2019 | Kim ................... G07C 9/00896 |

FOREIGN PATENT DOCUMENTS

| | | |
|---|---|---|
| CN | 108922000 A | 11/2018 |
| JP | 2001-195484 A | 7/2001 |
| JP | 2003-30591 A | 1/2003 |
| JP | 2003-242394 A | 8/2003 |
| JP | 2011-501924 A | 1/2011 |
| JP | 2011-511519 A | 4/2011 |
| JP | 2015-166904 A | 9/2015 |
| KR | 2003-0091418 | 12/2003 |
| TW | 201400684 A | 1/2014 |
| TW | 201537010 A | 10/2015 |
| TW | 201739284 A | 11/2017 |
| WO | 2007/081519 A2 | 7/2007 |
| WO | 2009/049985 A2 | 4/2009 |
| WO | 2009/091306 A1 | 7/2009 |
| WO | 2015/100167 A1 | 7/2015 |
| WO | 2017/160557 A1 | 9/2017 |

OTHER PUBLICATIONS

International Search Report (PCT/ISA/210) issued by the International Searching Authority in International Application No. PCT/JP2020/009206, issued on May 26, 2020.

Written Opinion (PCT/ISA/237) issued by the International Searching Authority in International Application No. PCT/JP2020/009206, issued on May 26, 2020.

"Times Car Plus for Car Sharing", [online], [Searched on Jan. 11, 2019], Internet <https://plus.timescar.jp/use/>.

Extended European Search Report dated Oct. 27, 2022 in European Application No. 20770651.6.

Communication dated Oct. 24, 2023 issued by the Taiwanese Patent Office in application No. 109107537.

Japanese Office Action dated Oct. 1, 2024 in Application No. 2021-504974.

* cited by examiner

USER MANAGEMENT TABLE

| USER ID | IP ADDRESS | CONTACT INFORMATION | CREDIT INFORMATION |
|---|---|---|---|
| 1234abc | FC01456AB...... | 090-1111-2222 | VISA 1234-4455-34555 |
| 6789xyz | FC01686CD...... | 080-0001-1245 | VISA 7777-4455-34555 |
| ...... | ...... | ...... | ...... |

(b)

TICKET MANAGEMENT TABLE

| TICKET ID | SEAT | NUMBER | RESERVATION USER ID | IP ADDRESS |
|---|---|---|---|---|
| 5845 | S | 102 | 1234abc | FC01456AB...... |
| 5846 | A | 12 | 1555gogo | FC01DC1D5...... |
| ...... | ...... | ...... | ...... | ...... |

FIG. 16

(a) USER MANAGEMENT TABLE

| USER ID | IP ADDRESS | CONTACT INFORMATION | CREDIT INFORMATION |
|---|---|---|---|
| 1234abc | FC01456AB..... | 090-1111-2222 | VISA 1234-4455-34555 |
| 6789xyz | FC01686CD..... | 080-0001-1245 | VISA 7777-4455-34555 |
| ...... | ...... | ...... | ...... |

(b) VEHICLE MANAGEMENT TABLE

| VEHICLE ID | IP ADDRESS | VEHICLE TYPE | STORAGE LOCATION |
|---|---|---|---|
| 1234 | FC03456AB..... | Burius | KYOTO CITY ... |
| 1235 | FC03DC1D5..... | Garolla | OSAKA PREFECTURE ... |
| ...... | ...... | ...... | ...... |

FIG. 17

VEHICLE RESERVATION MANAGEMENT TABLE (VEHICLE ID: 1234)

| DATE | TIME RANGE | USER ID | IP ADDRESS OF USER ID |
|---|---|---|---|
| 2019/1/31 | 8:00~21:00 | 1234abc | FC01456AB..... |
| 2019/2/1 | 9:00~18:00 | 1456faf | FC016A6CD..... |
| ...... | ...... | ...... | ...... |

FIG. 26

(a) USER MANAGEMENT TABLE

| USER ID | IP ADDRESS | CONTACT INFORMATION | CREDIT INFORMATION |
|---------|------------|---------------------|---------------------|
| 1234abc | FC01456AB..... | 090-1111-2222 | VISA 1234-4455-34555 |
| 6789xyz | FC01686CD..... | 080-0001-1245 | VISA 7777-4455-34555 |
| ...... | ...... | ...... | ...... |

(b) ROOM MANAGEMENT TABLE

| ROOM ID | IP ADDRESS | ROOM NUMBER | LOCATION |
|---------|------------|-------------|----------|
| 0001 | FC04456AB..... | 101 | 1F |
| 0002 | FC04DC1D5..... | 102 | 1F |
| ...... | ...... | ...... | ...... |

FIG. 27

ROOM RESERVATION MANAGEMENT TABLE

| DATE | TIME RANGE | USER ID | IP ADDRESS OF USER ID |
|---|---|---|---|
| 2019/1/31 | 0:00~11:00 | 1234abc | FC01456AB..... |
| 2019/2/1 | 15:00~00:00 | 1344cfe | FC016A6CD..... |
| ..... | ..... | ..... | ..... |

GATE OPENING METHOD AND DOOR UNLOCKING METHOD USING PORTABLE TERMINAL NETWORK ADDRESS

CROSS-REFERENCE TO RELATED APPLICATIONS

This application is a National Stage of International Application No. PCT/JP2020/009206 filed Mar. 4, 2020, claiming priority based on Japanese Patent Application No. 2019-042840, filed Mar. 8, 2019, the contents of all of which are incorporated herein by reference in their entirety.

TECHNICAL FIELD

The present disclosure relates to a gate opening method and a door unlocking method using a network address of a mobile terminal.

BACKGROUND ART

Currently, mobile terminals such as smartphones are rapidly becoming widespread, and mobile terminals are used in every aspect of daily life. Life without mobile terminals is no longer possible in modern society. For example, tickets used when using trains are being replaced by application software running on smartphones, such as Mobile Suica (registered trademark), from IC card tickets, such as Suica (registered trademark). In addition, airline tickets are being replaced by two-dimensional bar codes (QR codes and the like) displayed on the display screens of smartphones in place of paper tickets.

In addition, in sharing services that have been in the limelight recently (for example, home sharing services or car sharing services), reservations for the use of vehicles or rooms using smartphones are frequently made. For example, in the car sharing service disclosed in Non-Patent Literature 1, a user can reserve a vehicle using a smartphone and then use the reserved vehicle by holding a membership card for using the car sharing service over the reserved vehicle. In addition, in the home sharing service (private lodging), a user can reserve a room in a private house using a smartphone, but in order to use the reserved room, the user needs to receive a physical key of the reserved room from the owner of the reserved room. Similarly, even when using a hotel or a conference room, it is possible to reserve the hotel or the conference room using a smartphone, but in order to use the hotel or the conference room, it is necessary to receive a card key at the front desk or the like.

CITATION LIST

Patent Literature

Non-Patent Literature 1: "Times Car Plus for Car Sharing", [online], [Searched on Jan. 11, 2019], Internet <https://plus.timescar.jp/use/>

SUMMARY OF INVENTION

Technical Problem

Incidentally, while services using smartphones as mobile terminals have improved the convenience of the user, there is room for consideration of improving services using mobile terminals, such as smartphones, in the following points. For example, when a user uses a plurality of different car sharing services, it is necessary to manage a plurality of membership cards corresponding to the respective car sharing services. In addition, when using a hotel or private lodging, the user needs to receive a physical key to use the room. In addition, when using various services using a smartphone, it is necessary to install a plurality of pieces of application software corresponding to the respective services on the smartphone, and it is necessary to start the corresponding application software each time a predetermined service is used.

From the above viewpoint, it is an object of the present disclosure to improve the convenience of the user in various services using a mobile terminal. In particular, it is an object of the present disclosure to provide a gate opening method and a door unlocking method capable of improving the convenience of the user.

Solution to Problem

A gate opening method according to an aspect of the present disclosure includes: a step of transmitting a gate opening signal for making a request for opening of a gate, which is configured to restrict entry into a predetermined space, to the gate by using a network address unique to a mobile terminal associated with a user; a step of determining whether or not to allow the user to enter the predetermined space based on a management table and the network address of the mobile terminal in response to reception of the gate opening signal; and a step of controlling the gate so that the user is able to enter the predetermined space in response to a determination that the user is allowed to enter the predetermined space.

The management table includes a plurality of pieces of network address information indicating a plurality of network addresses unique to a plurality of mobile terminals each of which is associated with one of a plurality of users.

According to the method described above, it is determined whether or not to allow the user associated with the mobile terminal to enter the predetermined space by using the network address unique to the mobile terminal. For this reason, the mobile terminal itself can be used as an admission ticket that is used when entering the predetermined space. Therefore, the user does not need to bring a physical admission ticket or a two-dimensional bar code, and can pass through the gate only with the mobile terminal.

In addition, according to this method, the user can pass through a plurality of gates without preparing a physical ticket, a two-dimensional bar code, or the like corresponding to each gate when passing through the plurality of gates.

Therefore, it is possible to provide a gate opening method capable of improving the convenience of the user and providing the user with a new gate entrance experience.

In addition, the management table may further include a plurality of pieces of ticket information regarding a plurality of tickets. The gate opening method may further include a step of outputting ticket information associated with the user to an outside or transmitting the ticket information to the mobile terminal in response to the determination that the user is allowed to enter the predetermined space.

According to the method described above, since the user can acquire the ticket information when passing through the gate, the convenience of the user can be further improved.

In addition, the management table may include a user management table and a ticket management table. The user management table may include a plurality of pieces of user identification information regarding a plurality of users and the plurality of pieces of network address information each of which is associated with one of the plurality of pieces of user identification information. The ticket management table may include the plurality of pieces of user identification information.

The step of determining whether or not to allow the user to enter the predetermined space may include: a step of specifying user identification information corresponding to the network address of the mobile terminal based on the user management table and the network address of the mobile terminal; a step of determining whether or not the specified user identification information matches one of the plurality of pieces of user identification information included in the ticket management table based on the specified user identification information and the ticket management table; and a step of determining that the user is allowed to enter the predetermined space in a case where the specified user identification information matches one of the plurality of pieces of user identification information included in the ticket management table.

According to the method described above, it is possible to determine whether or not to allow the user associated with the mobile terminal to enter the predetermined space by referring to the user management table, the ticket management table, and the network address of the mobile terminal.

In addition, the management table may include a ticket management table.

The ticket management table may include the plurality of pieces of network address information.

The step of determining whether or not to allow the user to enter the predetermined space may include: a step of determining whether or not the network address of the mobile terminal matches one of the network addresses of the plurality of mobile terminals included in the ticket management table based on the ticket management table and the network address of the mobile terminal; and a step of determining that the user is allowed to enter the predetermined space in a case where the network address of the mobile terminal matches one of the network addresses of the plurality of mobile terminals included in the ticket management table.

According to the method described above, it is possible to determine whether or not to allow the user associated with the mobile terminal to enter the predetermined space by referring to the ticket management table and the network address of the mobile terminal.

The management table may be stored in a management server communicably connected to the gate through a communication network.

The step of determining whether or not to allow the user to enter the predetermined space may be executed by the management server and may include a step of receiving information regarding the network address of the mobile terminal from the gate through the communication network.

According to the method described above, whether or not to allow the user to enter the predetermined space is determined by the management server arranged on the communication network. Thus, there is no need to store the management table in the gate, and there is no need for the gate to execute the determination process.

In addition, the management table may be stored in the gate.

The step of determining whether or not to allow the user to enter the predetermined space may be executed by the gate.

According to the method described above, whether or not to allow the user to enter the predetermined space is determined by the gate. Thus, it is possible to execute the determination process without the intervention of the management server.

A gate opening program causing a computer to execute the gate opening method described above may be provided.

According to the above, it is possible to provide a gate opening program capable of improving the convenience of the user.

A computer-readable storage medium storing the gate opening program described above may be provided.

In addition, a gate opening system according to an aspect of the present disclosure includes: a mobile terminal associated with a user and having a unique network address; and a gate communicably connected to the mobile terminal and configured to restrict entry into a predetermined space.

The gate opening system is configured to execute the gate opening method described above.

According to the above, it is possible to provide a gate opening system capable of improving the convenience of the user.

In addition, the gate opening system may further include a management server communicably connected to the gate through a communication network.

A door unlocking method according to an aspect of the present disclosure includes: a step of transmitting a door unlock signal for making a request for unlocking of a door of an object, to the object by using a network address unique to a mobile terminal associated with a user; a step of determining whether or not to allow the unlocking of the door based on a management table and the network address of the mobile terminal in response to reception of the door unlock signal; and a step of unlocking the door in response to a determination that the unlocking of the door is allowed.

The management table includes a plurality of pieces of network address information indicating a plurality of network addresses unique to a plurality of mobile terminals each of which is associated with one of a plurality of users.

According to the method described above, it is determined whether or not to allow the unlocking of the door of the object by using the network address unique to the mobile terminal. For this reason, the mobile terminal itself can be used as a key for unlocking the door of the object (for example, a vehicle or a room). Therefore, the user does not need to bring a physical key (including a card key), and can unlock the door of the object only with the mobile terminal.

In addition, according to this method, without preparing a physical key corresponding to each object when using a plurality of objects, the user can unlock the doors of the plurality of objects.

Therefore, it is possible to provide a door unlocking method capable of improving the convenience of the user and providing the user with a new experience (for example, a sharing experience).

In addition, the door unlocking method may further include a step of locking or unlocking the door according to communication between the mobile terminal and the object after the door is unlocked.

According to the method described above, the door is locked or unlocked according to the communication between the mobile terminal and the object. Thus, even after the door of the object is unlocked, the mobile terminal can be continuously used as a key of the object.

In addition, the management table may include a user management table and a reservation management table for the object.

The user management table may include a plurality of pieces of user identification information regarding a plurality of users and the plurality of pieces of network address information each of which is associated with one of the plurality of pieces of user identification information.

The reservation management table may include the plurality of pieces of user identification information.

The step of determining whether or not to allow the unlocking of the door may include: a step of specifying user identification information corresponding to the network address of the mobile terminal based on the user management table and the network address of the mobile terminal; a step of determining whether or not the object is reserved by the user corresponding to the user identification information based on the specified user identification information and the reservation management table; and a step of determining that the unlocking of the door is allowed in a case where the object is reserved by the user corresponding to the user identification information.

According to the method described above, it is possible to determine whether or not to allow the unlocking of the door of the object by referring to the reservation management table for the object, the user management table, and the network address of the mobile terminal.

In addition, the management table may include a reservation management table for the object.

The reservation management table may include the plurality of pieces of network address information.

The step of determining whether or not to allow the unlocking of the door may include: a step of determining whether or not the object is reserved by the user associated with the mobile terminal based on the reservation management table and the network address of the mobile terminal; and a step of determining that the unlocking of the door is allowed when the object is reserved by the user associated with the mobile terminal.

According to the method described above, it is possible to determine whether or not to allow the unlocking of the door of the object by referring to the reservation management table for the object and the network address of the mobile terminal.

In addition, the management table may be stored in a management server communicably connected to the object through a communication network.

The step of determining whether or not to allow the unlocking of the door may be executed by the management server and may include a step of receiving information regarding the network address of the mobile terminal from the object through the communication network.

According to the method described above, whether or not to allow the unlocking of the door of the object is determined by the management server arranged on the communication network. Therefore, there is no need to store the reservation management table in the object, and there is no need for the object to execute the determination process.

The management table may be stored in the object.

The step of determining whether or not to allow the unlocking of the door may be executed by the object.

In addition, the object may be a vehicle.

According to the method described above, it is determined whether or not to allow the unlocking of the door of the vehicle by using the network address of the mobile terminal. For this reason, the mobile terminal itself can be used as a key for unlocking the door of the vehicle. Therefore, the user does not need to bring a physical key (including a card key), and can unlock the door of the vehicle only with the mobile terminal.

In addition, according to this method, without preparing a physical key corresponding to each vehicle when using a plurality of vehicles, the user can unlock the doors of the plurality of vehicles.

Therefore, it is possible to provide a door unlocking method capable of improving the convenience of the user and providing the user with a new car sharing experience or car rental experience.

In addition, the object may be a room.

According to the method described above, it is determined whether or not to allow the unlocking of the door of the room by using the network address of the mobile terminal. For this reason, the mobile terminal itself can be used as a key for unlocking the door of the room. Therefore, the user does not need to bring a physical key (including a card key), and can unlock the door of the room only with the mobile terminal.

In addition, according to this method, without preparing a physical key corresponding to each room when using a plurality of rooms, the user can unlock the doors of the plurality of rooms.

Therefore, it is possible to provide a door unlocking method capable of improving the convenience of the user and providing the user with a new room sharing experience.

In addition, a door unlocking program causing ae computer to execute the door unlocking method described above may be provided.

According to the above, it is possible to provide a door unlocking program capable of dramatically improving the convenience of the user.

In addition, a computer-readable storage medium storing the door unlocking program described above may be provided.

A door unlocking system includes: a mobile terminal associated with a user and having a unique network address; and an object communicably connected to the mobile terminal.

The door unlocking is configured to execute the door unlocking method described above.

According to the above, it is possible to provide a door unlocking system capable of dramatically improving the convenience of the user.

The door unlocking system may further include a management server connected to the object through a communication network.

Effect of Invention

According to the present disclosure, it is possible to improve the convenience of the user in various services using a mobile terminal. In particular, it is possible to provide a gate opening method and a door unlocking method capable of improving the convenience of the user.

BRIEF DESCRIPTION OF DRAWINGS

In FIG. 7, (a) is a diagram showing an example of a user management table, and (b) is a diagram showing an example of a ticket management table.

In FIG. 16, (a) is a diagram showing an example of a user management table, and (b) is a diagram showing an example of a vehicle management table.

FIG. 17 is a diagram showing an example of a vehicle reservation management table.

In FIG. 26, (a) is a diagram showing an example of a user management table, and (b) is a diagram showing an example of a room management table.

FIG. 27 is a diagram showing an example of a room reservation management table.

DESCRIPTION OF EMBODIMENTS (Gate Opening System)

Figure 1:
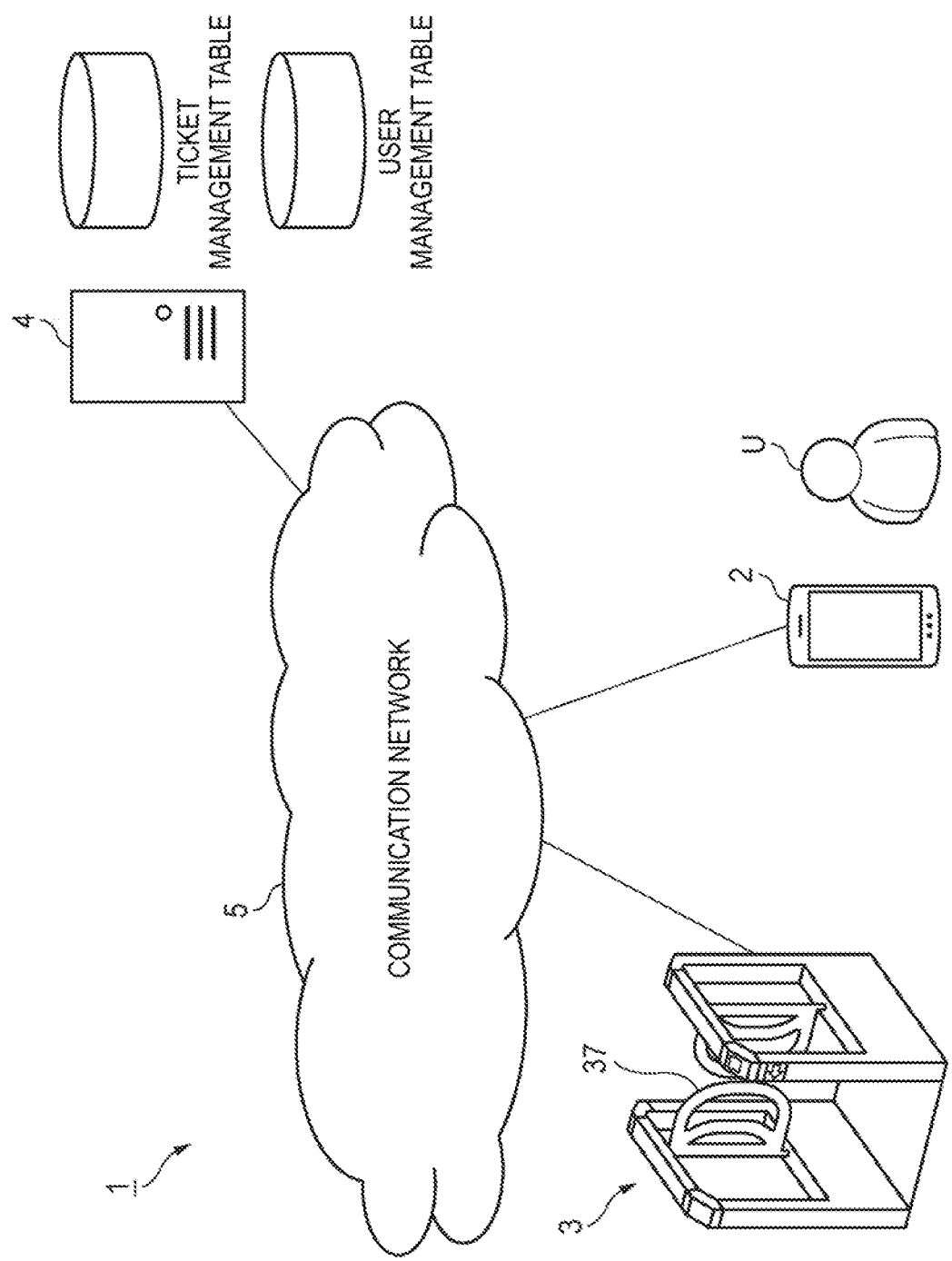
FIG. 1 is a diagram showing a gate opening system according to the present embodiment.

Hereinafter, a gate opening system 1 according to an embodiment of the present invention (hereinafter, referred to as the present embodiment) will be described with reference to the diagrams. First, the gate opening system 1 will be described with reference to FIG. 1. As shown in FIG. 1, the gate opening system 1 includes a mobile terminal 2 associated with a user U, a gate 3, and a management server 4. The mobile terminal 2, the gate 3, and the management server 4 are communicably connected to a communication network 5 wirelessly or by wire. The communication network 5 is an IP network, and includes at least one of a local area network (LAN), a wide area network (WAN), a radio access network (RAN), and the Internet. The mobile terminal 2 may be connected to the communication network 5 through an access point, such as a wireless LAN router or a wireless base station. The gate 3 and the management server 4 may be connected to a router through a wired cable.

Figure 2:
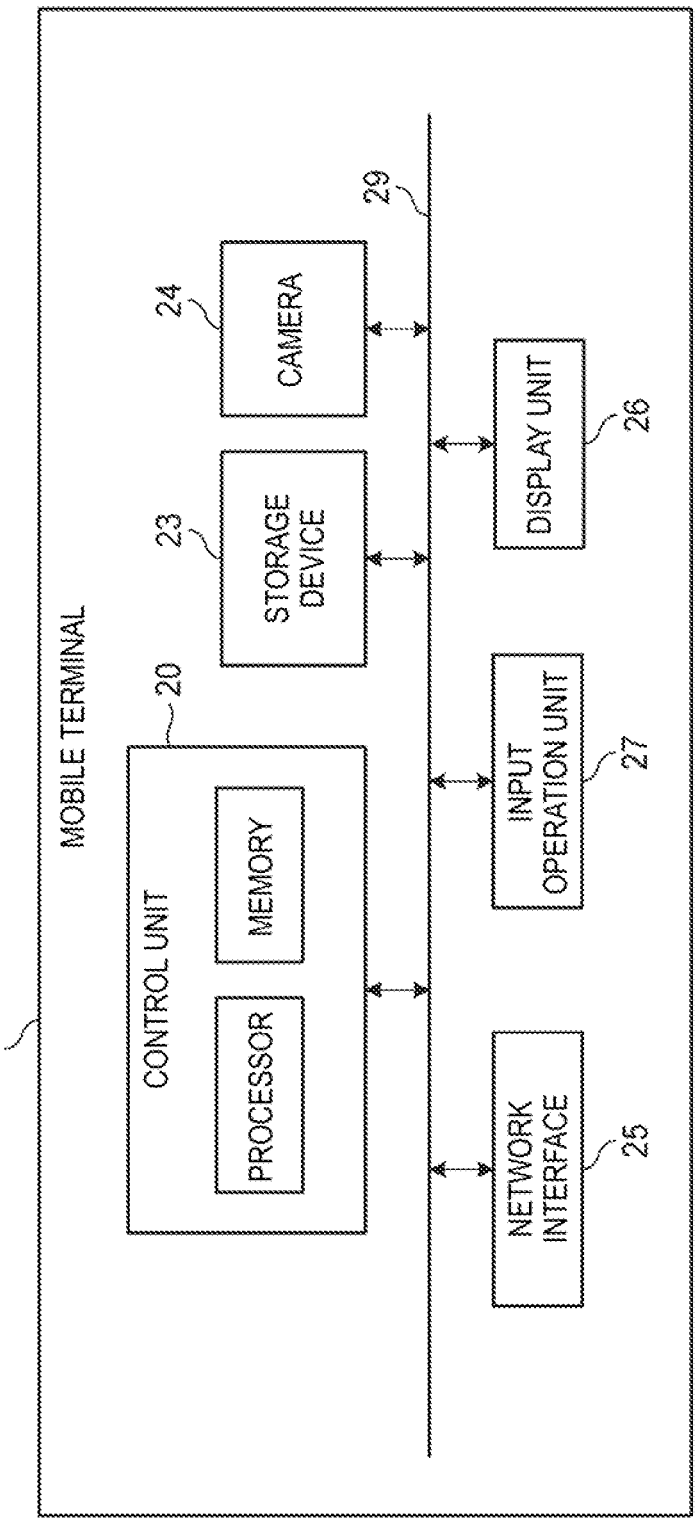
FIG. 2 is a diagram showing an example of the hardware configuration of a mobile terminal.

Next, the hardware configuration of the mobile terminal 2 will be described below with reference to FIG. 2. FIG. 2 is a diagram showing an example of the hardware configuration of the mobile terminal 2. The mobile terminal 2 is a communication device carried by the user U, and is typically a smartphone. In addition, the mobile terminal 2 may be a notebook computer, a tablet, or a wearable device (for example, a smart watch or an AR glass) worn on the user's body (for example, an arm or a head).

As shown in FIG. 2, the mobile terminal 2 includes a control unit 20, a storage device 23, a camera 24, a network interface 25, an input operation unit 27, and a display unit 26. These are directly or indirectly connected to each other through a bus 29.

The control unit 20 is configured to control the operation of the mobile terminal 2, and includes a memory and a processor. The memory is configured to store computer-readable instructions. For example, the memory may be configured by a read only memory (ROM) in which various programs and the like are stored, a random access memory (RAM) having a plurality of work areas in which various programs and the like executed by the processor are stored, or the like. The processor includes, for example, at least one of a CPU, a micro processing unit (MPU), and a graphics processing unit (GPU). The CPU may be configured by a plurality of CPU cores. The GPU may be configured by a plurality of GPU cores. The processor may be configured to load a program, which is designated from various programs read into the storage device 23 or the ROM, to the RAM and execute various processes in cooperation with the RAM. In particular, the mobile terminal 2 is configured to execute a part of the processing of the gate opening method according to the present embodiment by executing the program stored in the memory by the processor.

The storage device 23 is, for example, a storage device (storage) such as a hard disk drive (HDD), a Solid State Drive (SSD), or a flash memory, and is configured to store programs or various kinds of data.

The network interface 25 is configured to connect the mobile terminal 2 to the communication network 5. Specifically, the network interface 25 may include various wired connection terminals for communicating with an external apparatus, such as a server, through the communication network 5. In addition, the network interface 25 may include various processing circuits, antennas, and the like for communicating with a wireless router or a wireless base station. Wireless communication standards include, for example, at least one of Wi-Fi (registered trademark), Bluetooth (registered trademark), ZigBee (registered trademark), LPWA, 5th generation mobile communication system (5G), and near field communication (NFC).

The input operation unit 27 is configured to receive an input operation of the user U who operates the mobile terminal 2 and to generate an instruction signal corresponding to the input operation. The input operation unit 27 is, for example, a touch panel overlaid on the display unit 26, an operation button attached to the housing, a mouse and/or a keyboard. After the instruction signal generated by the input operation unit 27 is transmitted to the control unit 20 through the bus 29, the control unit 20 executes a predetermined operation in response to the instruction signal. The display unit 26 may be a display device, such as a liquid crystal display or an organic EL display. The display unit 26 and the input operation unit 27 may be connected to the mobile terminal 2 through an input and output interface, such as a USB interface.

In the present embodiment, the mobile terminal 2 has an IP address unique to the mobile terminal 2. The IP address of the mobile terminal 2 is significantly different from the conventional IP address in that this is not an IP address issued by an Internet service provider (ISP) but an IP address generated by the mobile terminal 2 itself. The IP address of the mobile terminal 2 is, for example, an IP address (128 bits) corresponding to IPv6 displayed in 32 hexadecimal digits.

In particular, the IP address may be generated based on the public key of the mobile terminal 2 authenticated by the certificate authority. Specifically, the control unit 20 generates a private key (512 bits) of the mobile terminal 2 and then generates a public key (256 bits) corresponding to the private key. Thereafter, the control unit 20 generates a hash value (256 bits) based on the public key and a predetermined hash function. Then, when the generated hash value satisfies predetermined conditions, the control unit 20 generates an IP address of the mobile terminal 2 based on the hash value. For example, the control unit 20 may determine the first 128 bits of the generated hash value (256 bits) as the IP address of the mobile terminal 2.

Thereafter, the mobile terminal 2 acquires a digital certificate associated with the public key from the certificate authority. Thus, since the public key of the mobile terminal 2 is authenticated by the certificate authority, the IP address generated based on the public key is also indirectly authenticated by the certificate authority. As described above, the IP address of the mobile terminal 2 is significantly different from the conventional IP address in that this is an IP address unique to the mobile terminal 2 and is an IP address authenticated by the certificate authority. In addition, the gate opening method according to the present embodiment is significantly different from the conventional gate opening method in that the mobile terminal 2 is used as an admission ticket.

In addition, after determining the IP address of the mobile terminal 2, the control unit 20 may check whether or not the IP address overlaps the IP address of another device. Specifically, the mobile terminal 2 transmits information regarding the IP address of the mobile terminal 2 to the IP address management server that manages the IP address through the communication network. The IP address management server determines whether or not the IP address transmitted from the mobile terminal 2 matches one of a plurality of IP addresses included in the IP address management table stored in its storage device. Here, when the IP address of the mobile terminal 2 matches one of the IP addresses included in the IP address management table, the IP address management server may transmit to the mobile terminal 2 a message indicating that the registration of the IP address is rejected. In this case, the mobile terminal 2 executes a series of processes for re-determining the IP address, and then transmits information regarding the re-determined IP address to the IP address management server. On the other hand, when the IP address of the mobile terminal 2 does not match any of the IP addresses included in the IP address management table, the IP address management server may transmit to the mobile terminal 2 a message indicating that the registration of the IP address is allowed.

Figure 3:
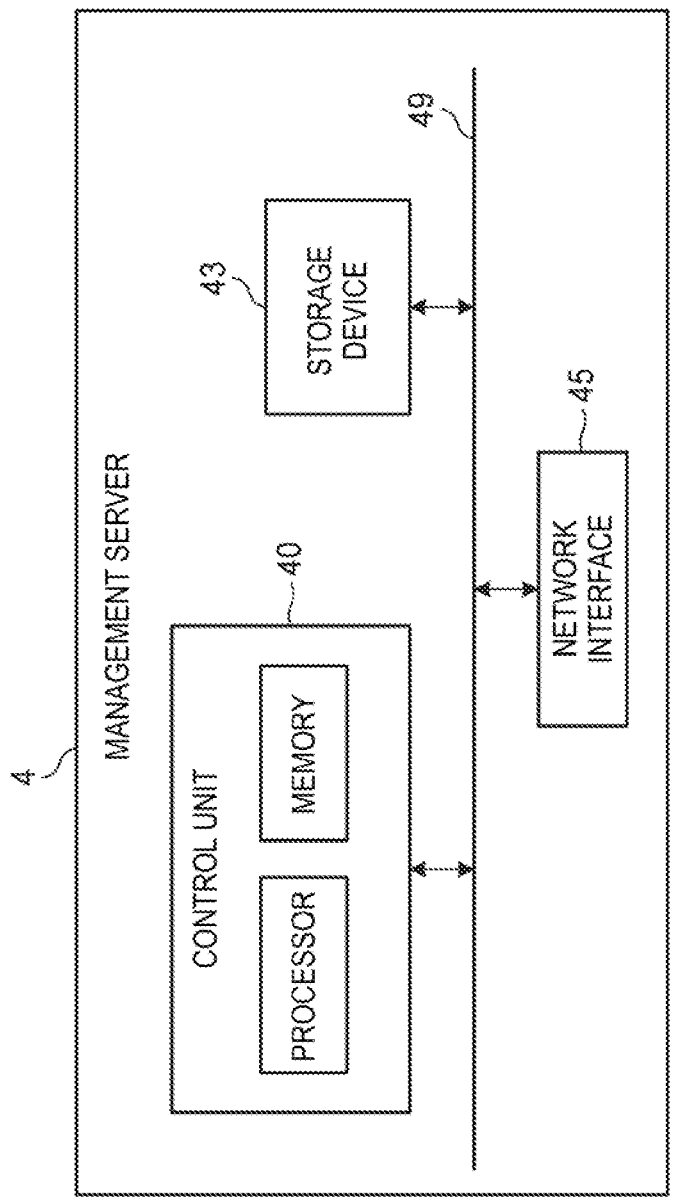
FIG. 3 is a diagram showing an example of the hardware configuration of a management server.

Next, the hardware configuration of the management server 4 will be described below with reference to FIG. 3. FIG. 3 is a diagram showing an example of the hardware configuration of the management server 4. The management server 4 is configured by one or more servers. In the present embodiment, it is assumed that the management server 4 also functions as a WEB server. As described above, the management server 4 means one or more servers associated with a provider that manages tickets.

As shown in FIG. 3, the management server 4 includes a control unit 40, a storage device 43, and a network interface 45. These are directly or indirectly connected to each other through a bus 49.

The control unit 40 is configured to control the operation of the management server 4, and includes a memory and a processor. The memory is configured to store computer-readable instructions. For example, the memory may be configured by a ROM in which various programs and the like are stored, a RAM having a plurality of work areas in which various programs and the like executed by the processor are stored, or the like. The processor includes, for example, at least one of a CPU, an MPU, and a GPU. The CPU may be configured by a plurality of CPU cores. The GPU may be configured by a plurality of GPU cores. The processor may be configured to load a program, which is designated from various programs read into the storage device 23 or the ROM, to the RAM and execute various processes in cooperation with the RAM. In particular, the management server 4 is configured to execute a part of the processing of the gate opening method according to the present embodiment by executing the program stored in the memory by the processor.

The storage device 43 is, for example, a storage device (storage) such as an HDD or an SSD, and is configured to store programs or various kinds of data. In particular, the storage device 43 is configured to store a user management table and a ticket management table (see FIG. 7). The network interface 45 is configured to connect the management server 4 to the communication network 5.

Figure 4:
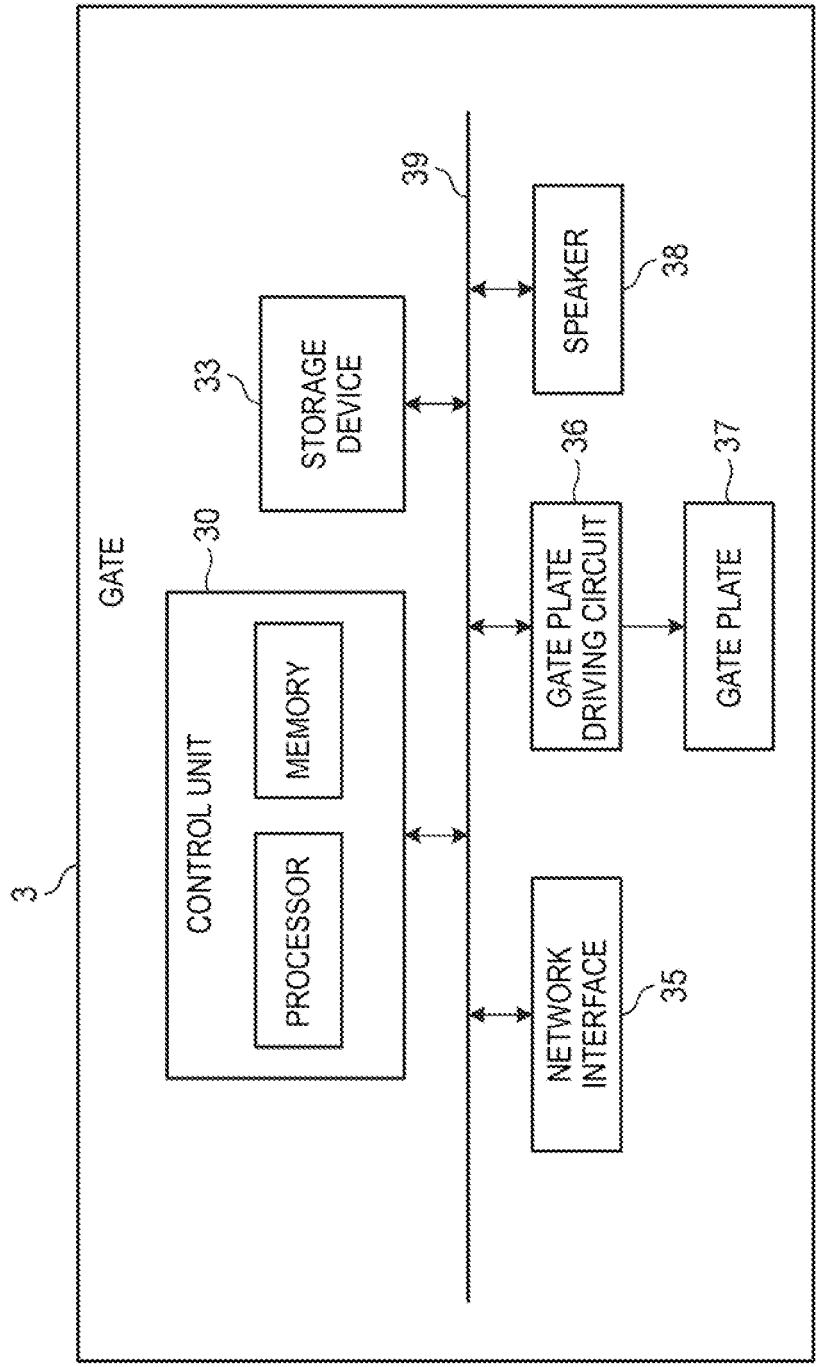
FIG. 4 is a diagram showing an example of the hardware configuration of a gate.

Next, the hardware configuration of the gate 3 will be described below with reference to FIG. 4. FIG. 4 is a diagram showing an example of the hardware configuration of the gate 3. The gate 3 may be an entrance gate configured to restrict entry into a predetermined space. In this regard, the gate 3 may be installed at the entrance of the space where only a person who purchased a predetermined ticket is allowed to enter. For example, the gate 3 may be installed at the entrance of a venue where a predetermined event (sports, music, amusement, or the like) is held. In addition, the gate 3 may be installed at the entrance of a facility where only the persons concerned can enter. In addition, the gate 3 may be installed at the entrance (for example, a ticket gate or a boarding gate) of a facility for using a predetermined public transportation system (for example, a railroad, an aircraft, or a ship).

As shown in FIG. 4, the gate 3 includes a control unit 30, a storage device 33, a network interface 35, a gate plate driving circuit 36, a gate plate 37, and a speaker 38. These components, except for the gate plate 37, are directly or indirectly connected to each other through a bus 39.

The control unit 30 is configured to control the operation of the gate 3, and includes a memory and a processor. The memory is configured to store computer-readable instructions. For example, the memory may be configured by a ROM in which various programs and the like are stored, a RAM having a plurality of work areas in which various programs and the like executed by the processor are stored, or the like. The processor includes, for example, at least one of a CPU, an MPU, and a GPU. The CPU may be configured by a plurality of CPU cores. The GPU may be configured by a plurality of GPU cores. The processor may be configured to load a program, which is designated from various programs read into the storage device 33 or the ROM, to the RAM and execute various processes in cooperation with the RAM. In particular, the gate 3 is configured to execute a part of the processing of the gate opening method according to the present embodiment by executing the program stored in the memory by the processor.

The storage device 33 is, for example, a storage device (storage) such as an HDD or an SSD, and is configured to store programs or various kinds of data. In particular, the storage device 33 may be configured to store a ticket management table (see (b) in FIG. 7). The network interface 35 is configured to connect the gate 3 to the communication network 5.

The gate plate driving circuit 36 is configured to drive the gate plate 37 in response to an instruction signal from the control unit 30. For example, the gate plate driving circuit 36 is configured to open/close the gate plate 37 in response to a gate opening signal/gate closing signal. The speaker 38 is configured to output a warning sound in response to an instruction signal from the control unit 30. In the present embodiment, it is assumed that the gate plate 37 is closed in the initial state so that an unspecified number of people cannot pass through the gate 3 (see FIG. 1).

In the present embodiment, the gate 3 has an IP address unique to the gate 3, similarly to the IP address of the mobile terminal 2. That is, the IP address of the gate 3 is not an IP address issued by the ISP but an IP address generated by the gate 3 itself. The IP address of the gate 3 is, for example, an IP address (128 bits) corresponding to IPv6 displayed in 32 hexadecimal digits. In addition, the IP address of the gate 3 may be generated based on the public key of the gate 3 authenticated by the certificate authority. In addition, the public key of the gate 3 may be authenticated by the certificate authority. As described above, the IP address of the gate 3 is an IP address unique to the gate 3 and an IP address authenticated by the certificate authority.

(Gate Opening Method According to the Present Embodiment)

Figure 5:
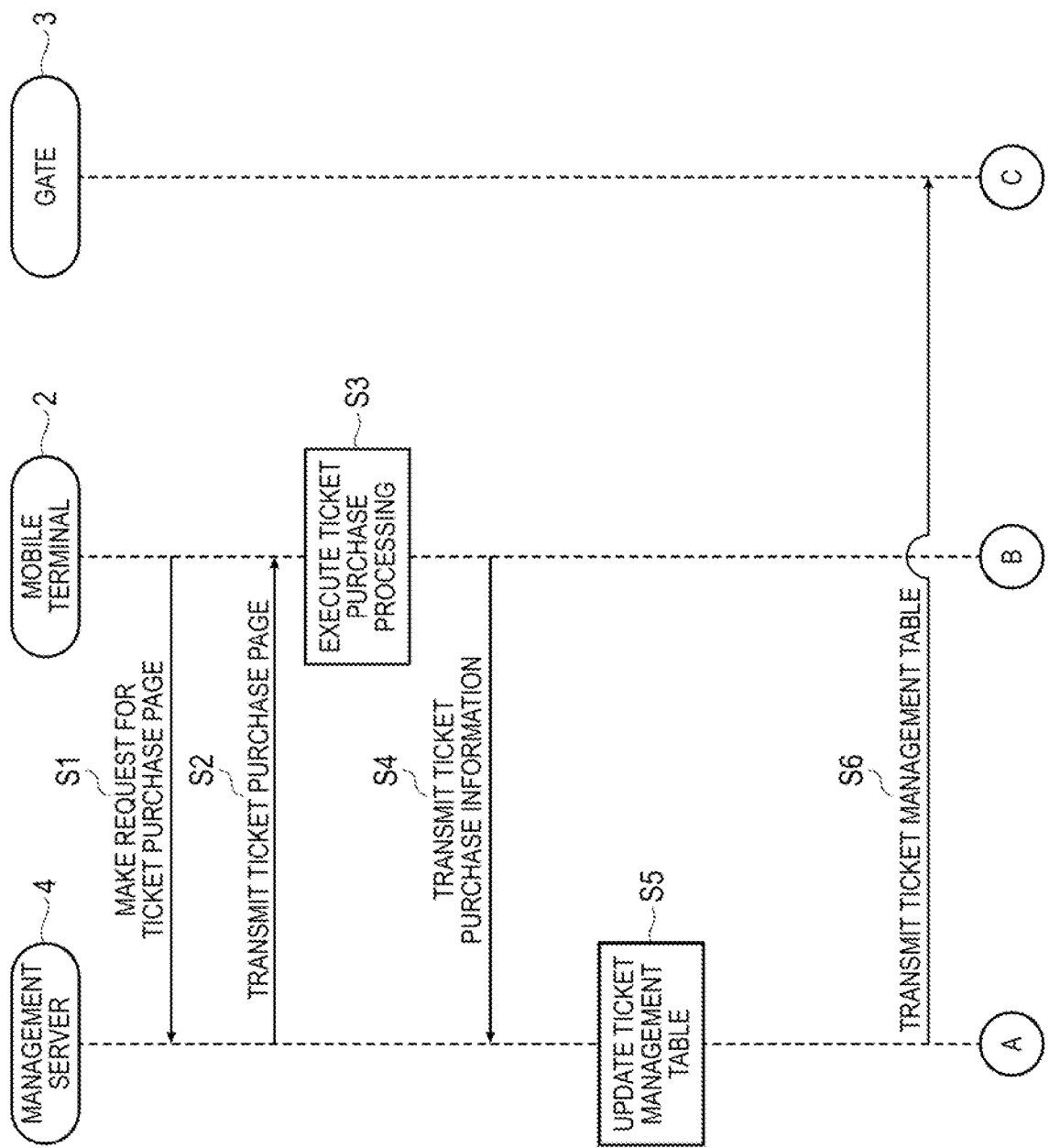
FIG. 5 is a sequence diagram for describing a gate opening method according to the present embodiment (case 1).
Figure 6:
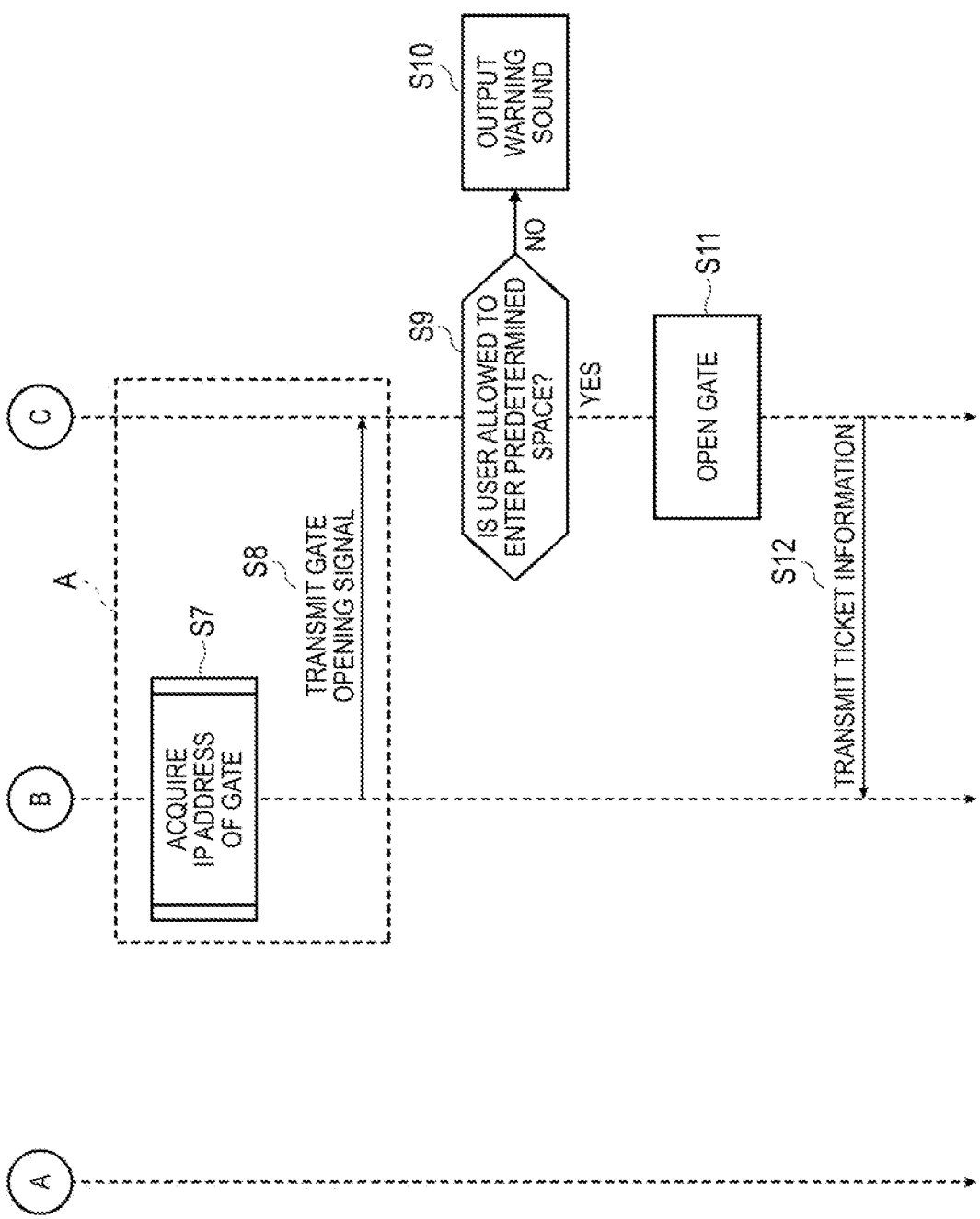
FIG. 6 is a sequence diagram for describing the gate opening method according to the present embodiment (case 2).

Next, the gate opening method according to the present embodiment will be described below with reference to FIGS. 5 and 6. FIGS. 5 and 6 are sequence diagrams for describing the gate opening method according to the present embodiment. As shown in FIG. 5, first, the mobile terminal 2 transmits a request signal of a ticket purchase page for purchasing a predetermined ticket (for example, a concert ticket) to the management server 4 through the communication network 5 (step S1). Here, it should be noted that the management server 4 also functions as a WEB server. In particular, the WEB browser of the mobile terminal 2 transmits the request signal to the management server 4 according to a communication protocol, such as an HTTP. Then, in response to the request signal transmitted from the mobile terminal 2, the management server 4 transmits a ticket purchase page (WEB page) to the mobile terminal 2 through the communication network 5 (step S2).

In addition, before and after executing the process of step S1, a login process for logging in to an online site (particularly, an online site for purchasing a ticket) provided by the management server 4 (WEB server) may be executed. In this case, the mobile terminal 2 may transmit login information (user ID and password) for logging in to the online site provided by the management server 4 to the management server 4 before and after executing the process of step S1. The management server 4 can authenticate the user U based on the transmitted login information. In addition, the management server 4 may authenticate the user U based on the IP address of the mobile terminal 2 instead of the login information. In this regard, since the IP address of the mobile terminal 2 functions as identification information for identifying the mobile terminal 2, the management server 4 authenticates the user U based on the IP address of the mobile terminal 2 without login information. In particular, the management server 4 can specify user attribute information such as a user ID corresponding to the IP address of the mobile terminal 2 by referring to the user management table (see (a) in FIG. 7).

Then, in step S3, the user U inputs ticket purchase information for purchasing a predetermined ticket to the mobile terminal 2 through the input operation unit 27 of the mobile terminal 2. For example, the user U may input seat information regarding the type of the seat at the concert hall or the seat number and/or information regarding the credit card (credit information). In this manner, the mobile terminal 2 executes the ticket purchase processing. In addition, when the credit information of the user U is already registered in the user management table, the user U does not have to input the credit information.

Then, in step S4, the mobile terminal 2 transmits the ticket purchase information input to the mobile terminal 2 to the management server 4. Thereafter, the management server 4 updates the ticket management table shown in (b) in FIG. 7 based on the ticket purchase information transmitted from the mobile terminal 2 (step S5). In this regard, the management server 4 generates a ticket ID of the ticket purchased by the user U, and then registers the generated ticket ID, the seat information, the user ID of the user U, and the IP address of the mobile terminal 2 in the ticket management table.

In addition, the user management table and the ticket management table shown in FIG. 7 are examples of management tables. The user management table and the ticket management table are stored in the storage device 43 (see FIG. 3) of the management server 4. The user management table includes a plurality of pieces of user ID information (user identification information) regarding a plurality of users, IP address information indicating a plurality of IP addresses unique to a plurality of mobile terminals, and a plurality of pieces of user attribute information (contact information, credit information, and the like). In the user management table, user IDs, IP addresses, and user attribute information are associated with each other. In particular, each of the plurality of pieces of user ID information is associated with one of the plurality of pieces of IP address information and one of the plurality of pieces of user attribute information.

In addition, the ticket management table includes a plurality of pieces of user ID information, a plurality of pieces of IP address information, a plurality of pieces of ticket ID information, and a plurality of pieces of seat information. In the ticket management table, user IDs, IP addresses, ticket IDs, and seat information are associated with each other. In particular, each of the plurality of pieces of user ID information is associated with one of the plurality of pieces of IP address information and one of the plurality of pieces of ticket ID information.

In addition, it should be noted that the user management table and the ticket management table shown in FIG. 7 are merely examples. For example, the ticket management table does not have to include IP address information. In addition, the user attribute information is not limited to contact information and credit information.

In addition, before and after the update processing of the ticket management table in step S5, the management server 4 may transmit information regarding the ticket purchase price and the credit information of the user U to an external server that executes the payment relevant to the ticket purchase. In this manner, the payment process relevant to the ticket purchase can be executed by the external server.

Then, in step S6, the management server 4 transmits the ticket management table to the gate 3 through the communication network 5. In this regard, the management server 4 may transmit the ticket management table to the gate 3 after a predetermined number of tickets are sold out or the ticket sale period has passed. The ticket management table may be stored in the storage device 33 of the gate 3.

In FIG. 5, a series of processes relevant to ticket purchase through the mobile terminal 2 has been described. Next, each process executed when the user U who purchased a predetermined ticket passes through the gate 3 installed at the entrance of a concert hall (an example of a predetermined space) will be described below with reference to FIG. 6. In the process from step S7, it is assumed that the user U is present in the vicinity of the gate 3.

Figure 8:
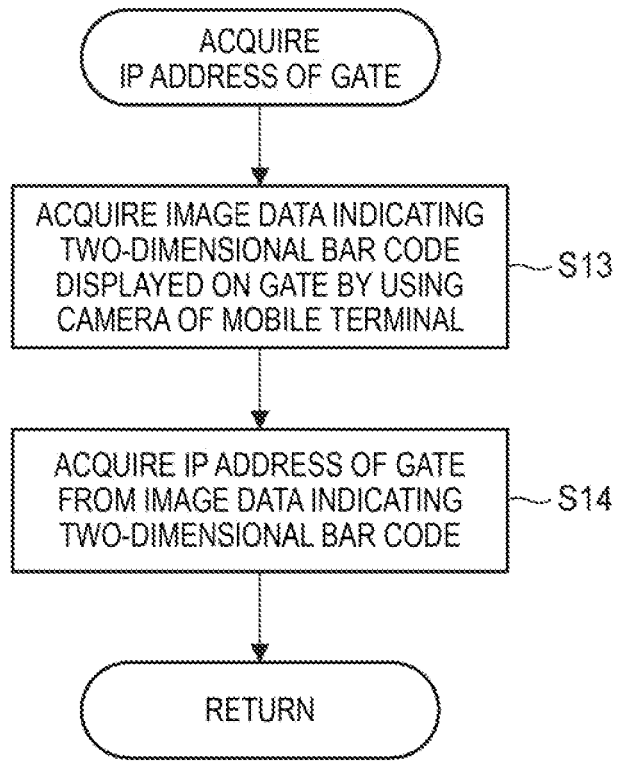
FIG. 8 is a flowchart for describing a process of acquiring an IP address of a gate.

As shown in FIG. 6, in step S7, the mobile terminal 2 acquires the IP address of the gate 3. Specifically, as shown in FIG. 8, in step S13, the user U captures a two-dimensional bar code (for example, QR code (registered trademark)) displayed on the gate 3 by using the camera 24 of the mobile terminal 2. Thereafter, the control unit 20 of the mobile terminal 2 acquires image data indicating the two-dimensional bar code acquired by the camera 24. Then, in step S14, the control unit 20 acquires information (128 bits) regarding the IP address of the gate 3 included in the two-dimensional pattern by analyzing the image data indicating the two-dimensional pattern.

Then, referring back to FIG. 6, in step S8, the mobile terminal 2 transmits a gate opening signal, which is for making a request for the opening of the gate 3, to the gate 3 through the communication network 5. Specifically, the mobile terminal 2 transmits the gate opening signal to the gate 3 by using the IP address of the mobile terminal 2 as a source address and the IP address of the gate 3 as a destination address. In this manner, the gate 3 can specify the IP address of the mobile terminal 2 by referring to the source address of the gate opening signal.

Then, the gate 3 determines whether or not to allow the user U to enter a predetermined space (for example, a concert hall) based on the ticket management table stored in the storage device 33 and the IP address of the mobile terminal 2 (step S9). Specifically, the gate 3 determines whether or not the IP address of the mobile terminal 2 matches one of the plurality of IP addresses included in the ticket management table. Here, when the IP address of the mobile terminal 2 matches one of the plurality of IP addresses included in the ticket management table, the gate 3 determines that the user U is allowed to enter the predetermined space (YES in step S9). On the other hand, when the IP address of the mobile terminal 2 does not match one of the plurality of IP addresses included in the ticket management table, the gate 3 determines that the user U is not allowed to enter the predetermined space (NO in step S9).

When the determination result in step S9 is YES, the control unit 30 of the gate 3 transmits a gate opening signal to the gate plate driving circuit 36. The gate plate driving circuit 36 controls the gate plate 37 to be opened in response to the gate opening signal (step S11). In this manner, the gate 3 is controlled so that the user U can enter the predetermined space. On the other hand, when the determination result in step S9 is NO, the gate 3 outputs a warning sound from the speaker 38 (step S10).

Then, in step S12, the gate 3 specifies seat information corresponding to the IP address of the mobile terminal 2 by referring to the ticket management table. Thereafter, the gate 3 transmits the seat information to the mobile terminal 2 as ticket information. Thereafter, the ticket information can be displayed on the display unit 26 of the mobile terminal 2. The gate 3 may output a receipt on which ticket information is printed. In this manner, since the user U can acquire the ticket information when passing through the gate 3, the convenience of the user U is improved.

As described above, according to the present embodiment, it is determined whether or not to allow the user U associated with the mobile terminal 2 to enter the predetermined space by using the IP address unique to the mobile terminal 2. For this reason, the mobile terminal 2 itself can be used as an admission ticket that is used when entering the predetermined space. Therefore, the user U does not need to bring a physical admission ticket or a two-dimensional bar code, and can pass through the gate 3 only with the mobile terminal 2.

In addition, according to the gate opening method according to the present embodiment, the user U can pass through a plurality of gates without preparing a physical ticket, a two-dimensional bar code, or the like corresponding to each gate when passing through the plurality of gates. Therefore, it is possible to provide the gate opening method and the gate opening system 1 capable of improving the convenience of the user U and providing the user U with a new gate entrance experience. In addition, according to the present embodiment, since the ticket management table is stored in the gate 3, it is determined whether or not to allow the user U to enter the predetermined space without the intervention of the management server 4.

Figure 9:
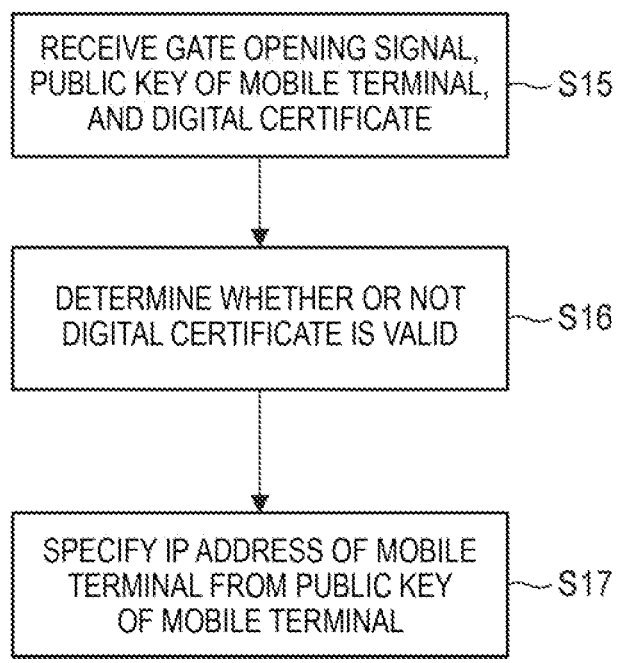
FIG. 9 is a flowchart for describing a process as an alternative to the process A shown in FIG. 6.

In addition, the process A including steps S7 and S8 shown in FIG. 6 may be replaced with a process shown in FIG. 9. In this regard, a process that is an alternative to the process A will be described below with reference to FIG. 9. FIG. 9 is a flowchart for describing a process that is an alternative to the process A shown in FIG. 6.

As shown in FIG. 9, in step S15, the mobile terminal 2 transmits a gate opening signal, a public key of the mobile terminal 2, and a digital certificate associated with the public key of the mobile terminal 2 to the gate 3 through the near field communication (NFC). For example, the user U connects the mobile terminal 2 to the NFC interface (a part of the network interface 35) of the gate 3, so that the gate opening signal, the public key, and the digital certificate are transmitted from the mobile terminal 2 to the gate 3.

Then, the gate 3 determines whether or not the received digital certificate is valid (step S16). In particular, the gate 3 checks the owner information, the issuer information, and the digital signature (hash value) of the digital certificate. Then, the gate 3 checks the expiration date of the digital certificate. Thereafter, the gate 3 determines the reliability of the issuer of the digital certificate. Here, the issuer of the digital certificate may be an intermediate certificate authority.

Then, after determining that the digital certificate is valid, the gate 3 specifies the IP address of the mobile terminal 2 from the public key of the mobile terminal 2 (step S17). Specifically, the gate 3 generates a hash value based on the public key (256 bits) of the mobile terminal 2 and a predetermined hash function, and then specifies the IP address of the mobile terminal 2 from the generated hash value. In this regard, when the hash value is 256 bits, the first 128 bits of the hash value are determined as the IP address of the mobile terminal 2. Thus, since it is possible to specify the IP address of the mobile terminal 2, the gate 3 can determine whether or not to allow the user U to enter the predetermined space based on the specified IP address of the mobile terminal 2 and the ticket management table.

(Gate Opening Method According to a Modification Example)

Figure 10:
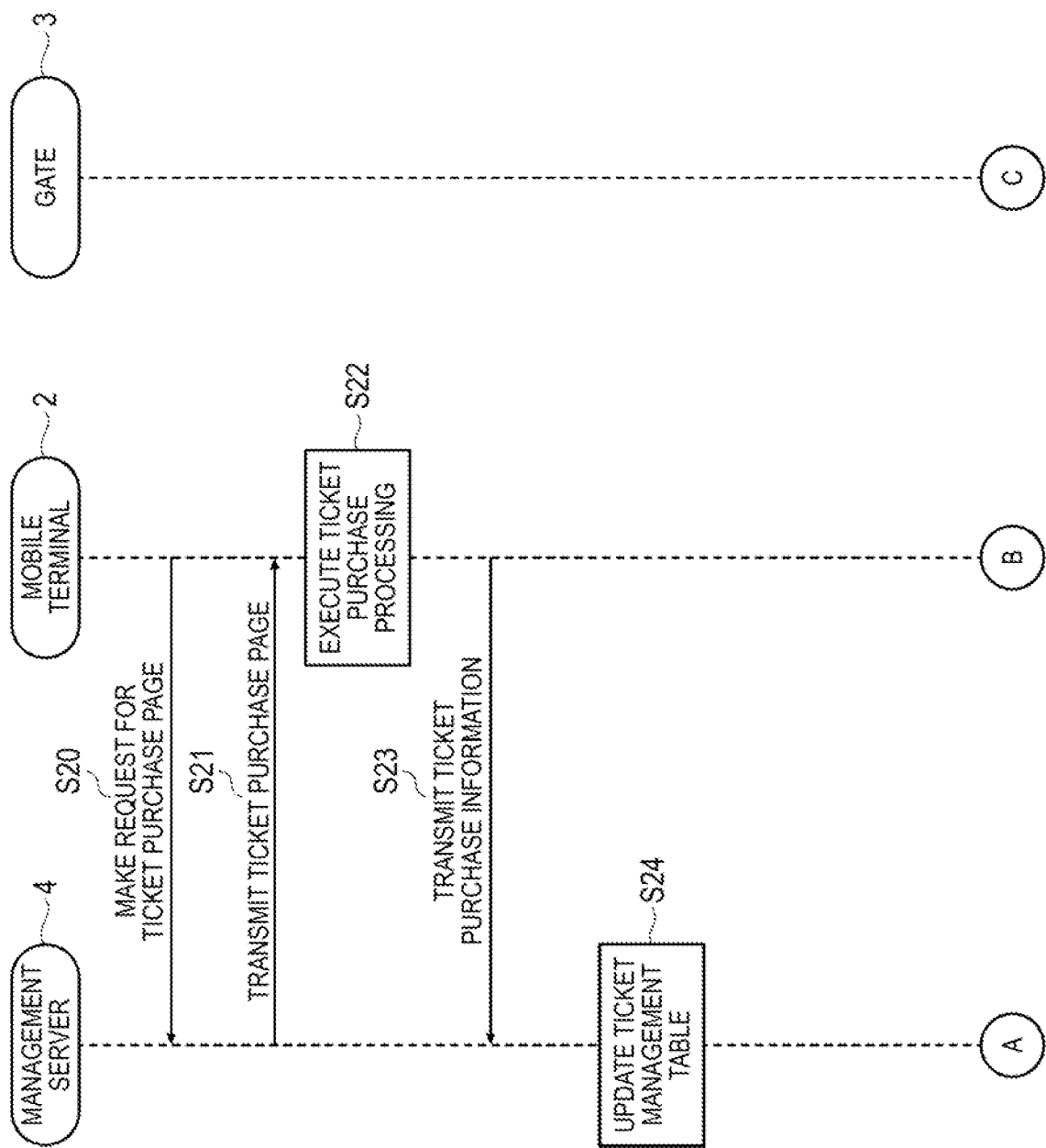
FIG. 10 is a sequence diagram for describing a gate opening method according to a modification example (case 1).
Figure 11:
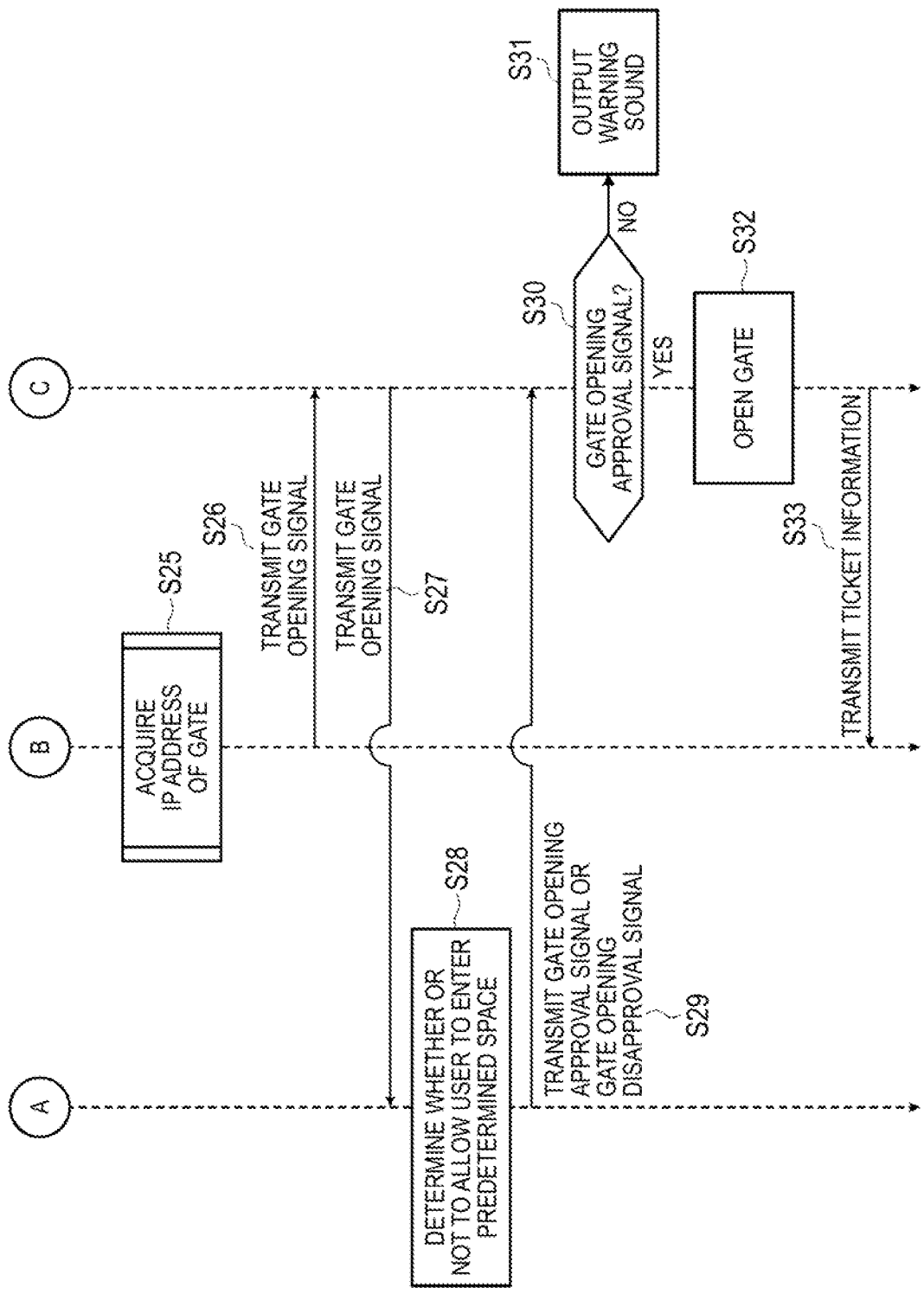
FIG. 11 is a sequence diagram for describing a gate opening method according to a modification example (case 2).

Next, a gate opening method according to a modification example will be described below with reference to FIGS. 10 and 11. FIGS. 10 and 11 are sequence diagrams for describing the gate opening method according to the modification example. The gate opening method according to the modification example is different from the gate opening method according to the present embodiment in that the management server 4 executes a process of determining whether or not to allow the user U to enter the predetermined space. In addition, in explaining the gate opening method according to the modification example, the same processing as the processing of the gate opening method of the present embodiment will not be repeatedly described.

As shown in FIG. 10, the processes of steps S20 to S24 are the same as the processes of steps S1 to S5 shown in FIG. 5, and accordingly no particular description thereof will be given. In addition, in the gate opening method shown in FIG. 5, after the process of step S5 (particularly, after predetermined tickets are sold out or the ticket sale period has passed), the management server 4 transmits the ticket management table to the gate 3. On the other hand, in the gate opening method according to the modification example, the management server 4 does not transmit the ticket management table to the gate 3.

Then, as shown in FIG. 11, in step S25, the mobile terminal 2 acquires the IP address of the gate 3. Thereafter, the mobile terminal 2 transmits a gate opening signal to the gate 3 through the communication network 5 by using the IP address of the mobile terminal 2 as a source address and the IP address of the gate 3 as a destination address (step S26). Here, the process of step S25 is the same as the process of step S7 shown in FIG. 6. In addition, each process shown in FIG. 9 may be applied instead of the processes of steps S25 and S26.

Then, the gate 3 transmits the gate opening signal and the information indicating the IP address of the mobile terminal 2 to the management server 4 through the communication network 5 (step S27). Thereafter, the management server 4 determines whether or not to allow the user U to enter a predetermined space (for example, a concert hall) based on the ticket management table stored in the storage device 43 and the IP address of the mobile terminal 2 (step S28). Specifically, the management server 4 determines whether or not the IP address of the mobile terminal 2 matches one of the plurality of IP addresses included in the ticket management table.

Here, when the IP address of the mobile terminal 2 matches one of the plurality of IP addresses included in the ticket management table, the management server 4 determines that the user U is allowed to enter the predetermined space and then transmits a gate opening approval signal and ticket information (seat information) to the gate 3 through the communication network 5 (step S29). On the other hand, when the IP address of the mobile terminal 2 does not match one of the plurality of IP addresses included in the ticket management table, the management server 4 determines that the user U is not allowed to enter the predetermined space and then transmits a gate opening disapproval signal to the gate 3 through the communication network 5 (step S29).

Then, when the signal transmitted from the management server 4 is a gate opening approval signal (YES in step S30), the gate 3 opens the gate plate 37 so that the user U can enter the predetermined space (step S32). On the other hand, when the signal transmitted from the management server 4 is a gate opening disapproval signal (NO in step S30), the gate 3 outputs a warning sound from the speaker 38 (step S31).

Thereafter, in step S33, the gate 3 transmits the ticket information transmitted from the management server 4 to the mobile terminal 2. Thereafter, the ticket information can be displayed on the display unit 26 of the mobile terminal 2.

As described above, also in the gate opening method according to the modification example, it is determined whether or not to allow the user U associated with the mobile terminal 2 to enter the predetermined space by using the IP address unique to the mobile terminal 2. For this reason, the mobile terminal 2 itself can be used as an admission ticket that is used when entering the predetermined space. Therefore, the user U does not need to bring a physical admission ticket or a two-dimensional bar code, and can pass through the gate 3 only with the mobile terminal 2. In addition, in the gate opening method according to the modification example, it is not necessary to store the ticket management table in the gate 3, and it is not necessary for the gate 3 to execute the admission determination process.

In addition, when the ticket management table shown in (b) in FIG. 7 does not include IP address information, the management server 4 may execute the admission determination process defined in step S28 by referring to both the user management table and the ticket management table. In this case, first, the management server 4 specifies the user ID of the user U corresponding to the IP address of the mobile terminal 2 based on the IP address of the mobile terminal 2 and the user management table. Thereafter, the management server 4 may determine whether or not the user ID matches one of the plurality of user IDs included in the ticket management table based on the specified user ID and the ticket management table.

(Vehicle Door Unlocking System)

Figure 12:
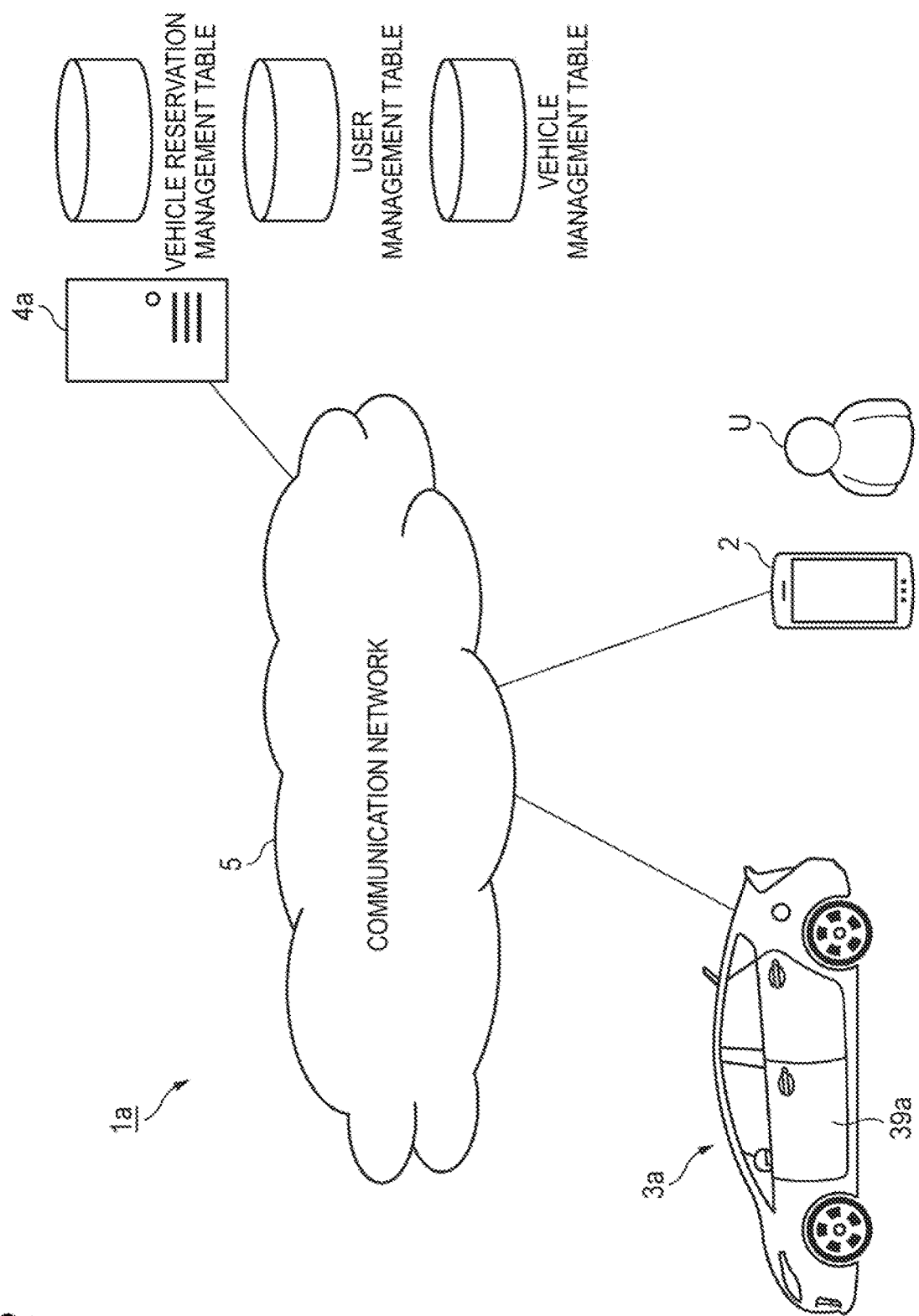
FIG. 12 is a diagram showing a vehicle door unlocking system according to the present embodiment.

Next, a door unlocking system 1a for a vehicle 3a according to the present embodiment will be described with reference to the diagrams. First, the door unlocking system 1a will be described with reference to FIG. 12. As shown in FIG. 12, the door unlocking system 1a includes the mobile terminal 2 associated with the user U, the vehicle 3a, and a management server 4a. The mobile terminal 2, the vehicle 3a, and the management server 4a are communicably connected to the communication network 5 wirelessly or by wire. The mobile terminal 2 and the vehicle 3a may be connected to the communication network 5 through an access point, such as a wireless LAN router or a wireless base station. The management server 4a may be connected to a router through a wired cable.

Figure 13:
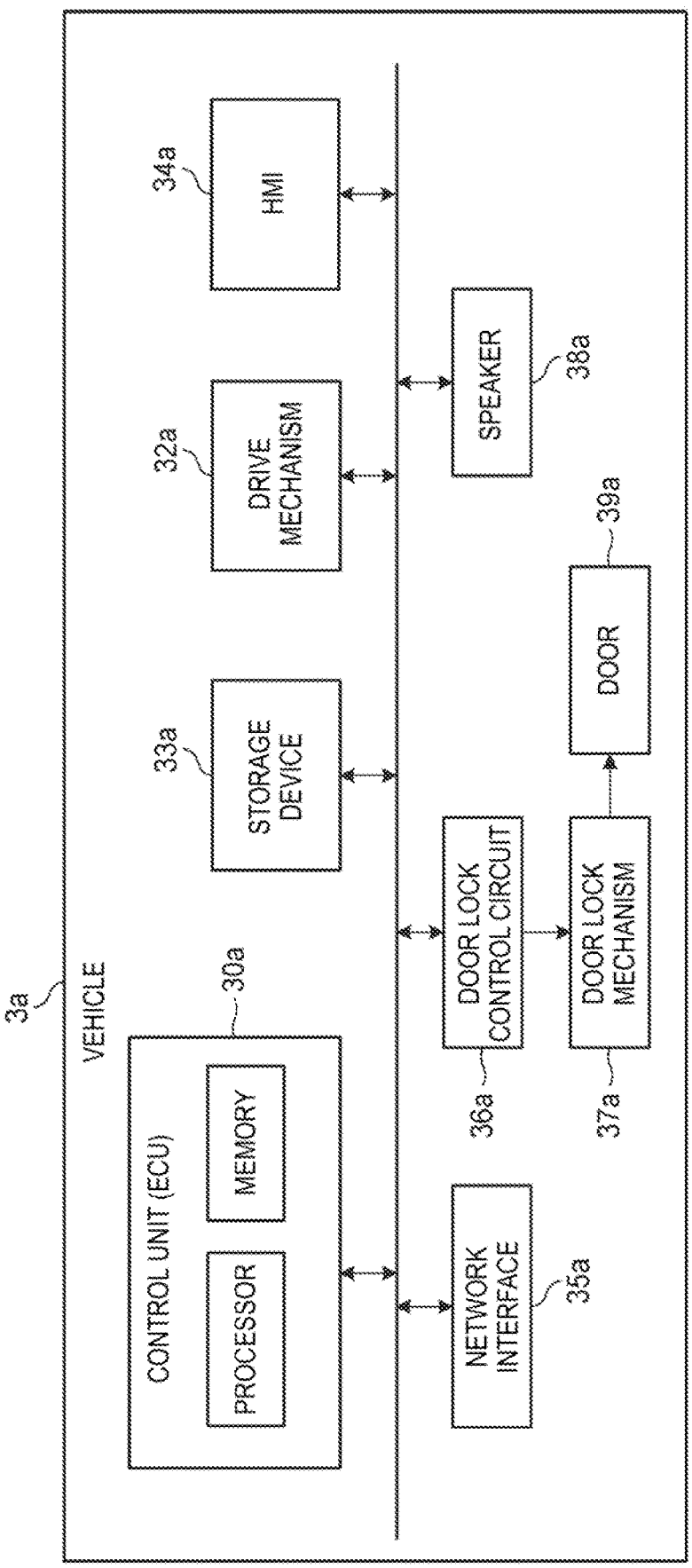
FIG. 13 is a diagram showing an example of the hardware configuration of a vehicle.

Next, the hardware configuration of the vehicle 3a will be described below with reference to FIG. 13. FIG. 13 is a diagram showing an example of the hardware configuration of the vehicle 3a. The vehicle 3a is a connected vehicle that is connected to the communication network 5. The vehicle 3a may be, for example, a vehicle used for providing a car sharing service or a rental car service. In addition, the vehicle 3a is not limited to a general vehicle, and may be an industrial vehicle. In addition, the vehicle 3a is not limited to the four-wheeled vehicle, and may be a two-wheeled vehicle or a three-wheeled vehicle.

As shown in FIG. 13, the vehicle 3a includes a control unit 30a, a storage device 33a, a drive mechanism 32a, a human machine interface (HMI) 34a, and a network interface 35a. The vehicle 3a further includes a door lock control circuit 36a, a door lock mechanism 37a, a door 39a, and a speaker 38a. These components of the vehicle 3a are directly or indirectly connected to each other through a bus based on the CAN or Ethernet (registered trademark) standard.

The control unit 30a is configured by, for example, at least one electronic control unit (ECU). The control unit 30a includes a computer system including one or more processors and one or more memories. The memory is configured to store computer-readable instructions. For example, the memory may be configured by a ROM and a RAM. The processor includes, for example, at least one of a CPU, an MPU, and a GPU. The CPU may be configured by a plurality of CPU cores. The GPU may be configured by a plurality of GPU cores. The processor may be configured to load a program, which is designated from various programs read into the storage device 33a or the ROM, to the RAM and execute various processes in cooperation with the RAM. In particular, the vehicle 3a is configured to execute a part of the processing of the vehicle door unlocking method according to the present embodiment by executing the program stored in the memory by the processor.

The storage device 33a is, for example, a storage device (storage) such as an HDD or an SSD, and is configured to store programs or various kinds of data. In particular, the storage device 33a may be configured to store a vehicle reservation management table (see FIG. 17). The drive mechanism 32a includes an accelerator device, a brake device, and a steering device. The HMI 34a includes a steering wheel, an accelerator pedal, and a brake pedal. In addition, the HMI 34a may include a display unit that displays information regarding the vehicle 3a. The network interface 35a is configured to connect the vehicle 3a to the communication network 5.

The network interface 35a is configured to connect the vehicle 3a to the communication network 5. The network interface 35a may include various processing circuits and antennas for communicating with a wireless router or a wireless base station. Wireless communication standards include, for example, at least one of Wi-Fi, Bluetooth, ZigBee, LPWA, 5th generation mobile communication system (5G), and NFC.

The door lock control circuit 36a is configured to control the door lock mechanism 37a in response to an instruction signal from the control unit 30a. The door lock mechanism 37a is provided on the door 39a and is configured to lock or unlock the door 39a. For example, the door lock control circuit 36a is configured to lock or unlock the door 39a by driving the door lock mechanism 37a provided on the door 39a in response to a door lock signal/door unlock signal transmitted from the control unit 30a.

The management server 4a has the same configuration as the management server 4 shown in FIG. 3. In this regard, the storage device of the management server 4a stores a user management table and a vehicle management table (see FIG. 16) and a vehicle reservation management table (see FIG. 17). In the present embodiment, it is assumed that the management server 4a also functions as a WEB server. The management server 4a means one or more servers associated with a provider that manages vehicle use reservations.

In the present embodiment, the vehicle 3a has an IP address unique to the vehicle 3a, similarly to the IP address of the mobile terminal 2. That is, the IP address of the vehicle 3a is not an IP address issued by the ISP but an IP address generated by the vehicle 3a itself. The IP address of the vehicle 3a is, for example, an IP address (128 bits) corresponding to IPv6 displayed in 32 hexadecimal digits. In addition, the IP address of the vehicle 3a may be generated based on the public key of the vehicle 3a authenticated by the certificate authority. In addition, the public key of the vehicle 3a may be authenticated by the certificate authority. As described above, the IP address of the vehicle 3a is an IP address unique to the vehicle 3a and an IP address authenticated by the certification authority.

(Vehicle Door Unlocking Method According to the Present Embodiment)

Figure 14:
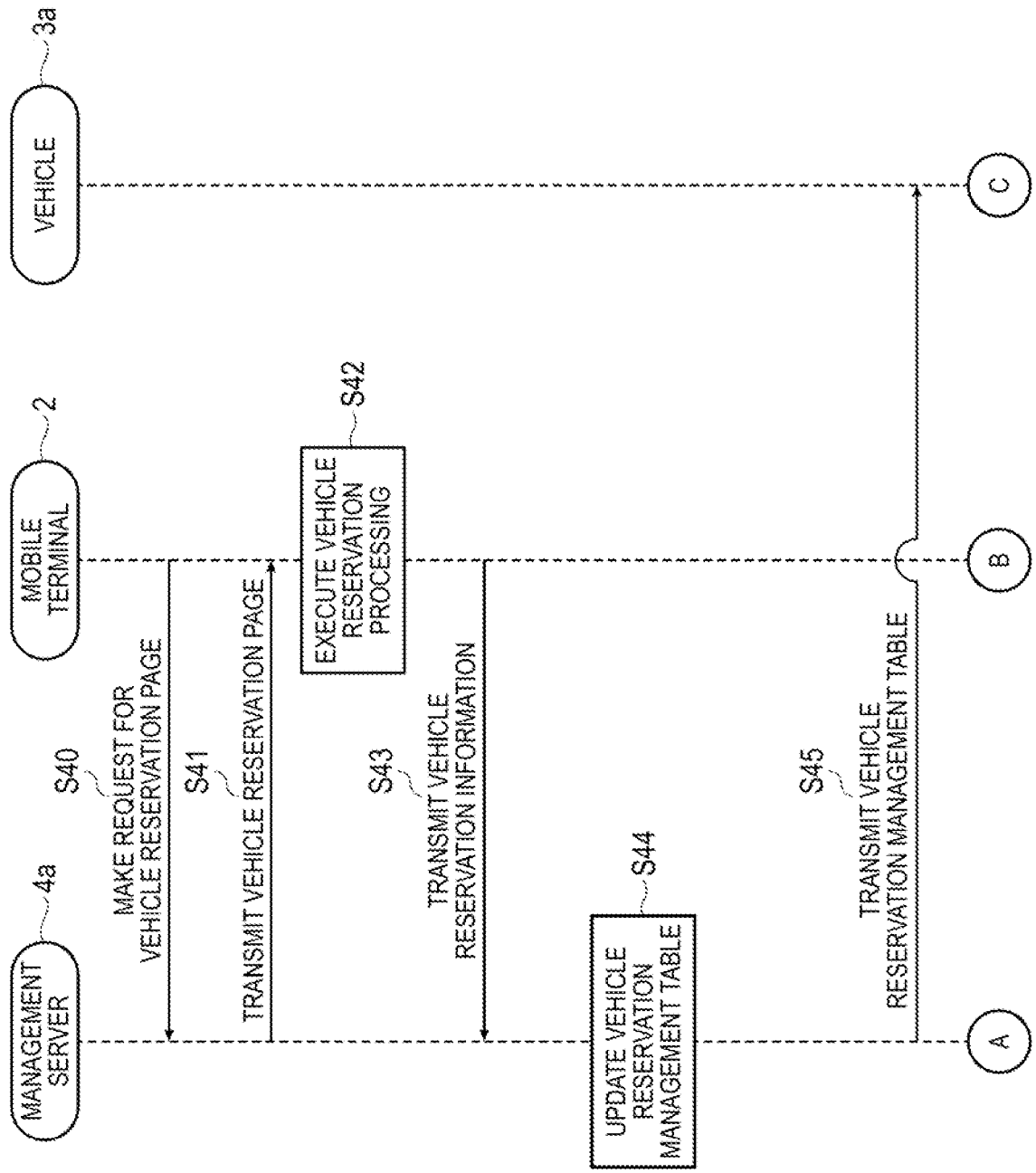
FIG. 14 is a sequence diagram for describing a vehicle door unlocking method according to the present embodiment (case 1).
Figure 15:
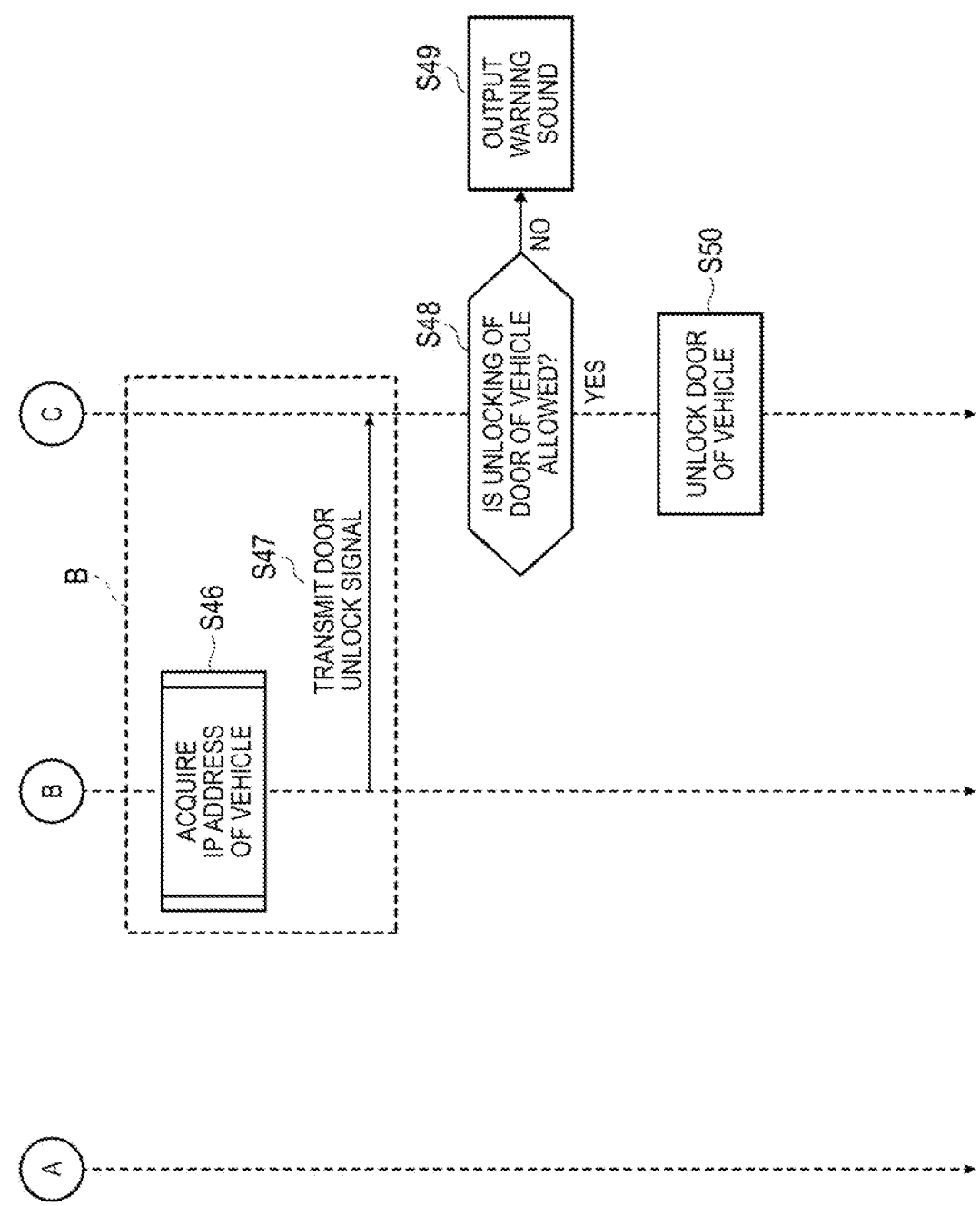
FIG. 15 is a sequence diagram for describing a vehicle door unlocking method according to the present embodiment (case 2).

Next, a method of unlocking the door of the vehicle 3a according to the present embodiment will be described below with reference to FIGS. 14 and 15. FIGS. 14 and 15 are sequence diagrams for describing the method of unlocking the door of the vehicle 3a. As shown in FIG. 14, first, the mobile terminal 2 transmits a request signal, which is for making a request for a vehicle reservation page for reserving the use of the vehicle 3a, to the management server 4a through the communication network 5 (step S40). Here, it should be noted that the management server 4a also functions as a WEB server. In particular, the WEB browser of the mobile terminal 2 transmits the request signal to the management server 4a according to a communication protocol, such as an HTTP. Then, in response to the request signal transmitted from the mobile terminal 2, the management server 4a transmits a vehicle reservation page (WEB page) to the mobile terminal 2 through the communication network 5 (step S41). In addition, before and after executing the process of step S40, a login process for logging in to an online site (particularly, an online site for vehicle use reservation) provided by the management server 4a (WEB server) may be executed.

Then, in step S42, the user U inputs vehicle reservation information for making a reservation for using the vehicle 3a to the mobile terminal 2 through the input operation unit 27 of the mobile terminal 2. The vehicle reservation information includes, for example, information for specifying the vehicle 3a, which is a reserved vehicle, and information regarding the date and time of use of the vehicle 3a. In this manner, the mobile terminal 2 executes the vehicle reservation processing.

Then, in step S43, the mobile terminal 2 transmits the vehicle reservation information input to the mobile terminal 2 to the management server 4a. Thereafter, the management server 4a updates the vehicle reservation management table (see FIG. 17) associated with the vehicle 3a based on the vehicle reservation information transmitted from the mobile terminal 2, the user management table, and the vehicle management table (step S44). In this regard, the management server 4a specifies a vehicle ID corresponding to the vehicle 3a based on the information for specifying the vehicle 3a included in the vehicle reservation information and the vehicle management table. Then, the management server 4a reads out a vehicle reservation table associated with the vehicle ID of the vehicle 3a. Thereafter, the management server 4a updates the vehicle reservation management table relevant to the vehicle 3a with reference to the information regarding the date and time of the use of the vehicle 3a and the information regarding the user U (user ID, IP address of the mobile terminal 2, and the like) included in the vehicle reservation information.

In addition, the user management table and the vehicle management table (see FIG. 16) and the vehicle reservation management table (see FIG. 17) are examples of management tables. These management tables are stored in the storage device of the management server 4a. The user management table includes a plurality of pieces of user ID information (user identification information) indicating the IDs of a plurality of users, IP address information indicating a plurality of IP addresses unique to a plurality of mobile terminals, and a plurality of pieces of user attribute information (contact information, credit information, and the like). The vehicle management table includes vehicle ID information indicating the IDs of a plurality of vehicles, IP address information indicating the IP addresses of a plurality of vehicles, and a plurality of pieces of vehicle attribute information (vehicle type, storage location, and the like). In the user management table, user IDs, IP addresses, and user attribute information are associated with each other. In particular, each of the plurality of pieces of user ID information is associated with one of the plurality of pieces of IP address information and one of the plurality of pieces of user attribute information. Similarly, in the vehicle management table, vehicle IDs, IP addresses, and vehicle attribute information are associated with each other.

In addition, the vehicle reservation management table includes information regarding the vehicle use date and use time range, user ID information, and IP address information corresponding to the user ID. In the vehicle reservation management table, these pieces of information are associated with each other. For example, the user ID of the user U, the IP address of the mobile terminal 2 associated with the user U, and the information regarding the use date and the use time range in which the user U uses the vehicle 3a are registered in the vehicle reservation management table.

Then, in step S45, the management server 4a transmits the vehicle reservation management table to the vehicle 3a through the communication network 5. Thereafter, the vehicle reservation management table is stored in the storage device 33a of the vehicle 3a. In addition, instead of the vehicle reservation management table, the management server 4a may transmit information regarding the use date and use time range of the vehicle 3a and information regarding the user U (user ID, IP address of the mobile terminal 2, and the like) to the vehicle 3a. In this case, the vehicle 3a may update the vehicle reservation management table stored in the storage device 33a based on the pieces of information transmitted from the management server 4a.

In FIG. 14, a series of processes relevant to vehicle use reservation through the mobile terminal 2 has been described. Next, a process of unlocking the door 39a of the vehicle 3a, which is a reserved vehicle, will be described below with reference to FIG. 15. In the process from step S46, it is assumed that the user U is present in the vicinity of the vehicle 3a.

Figure 18:
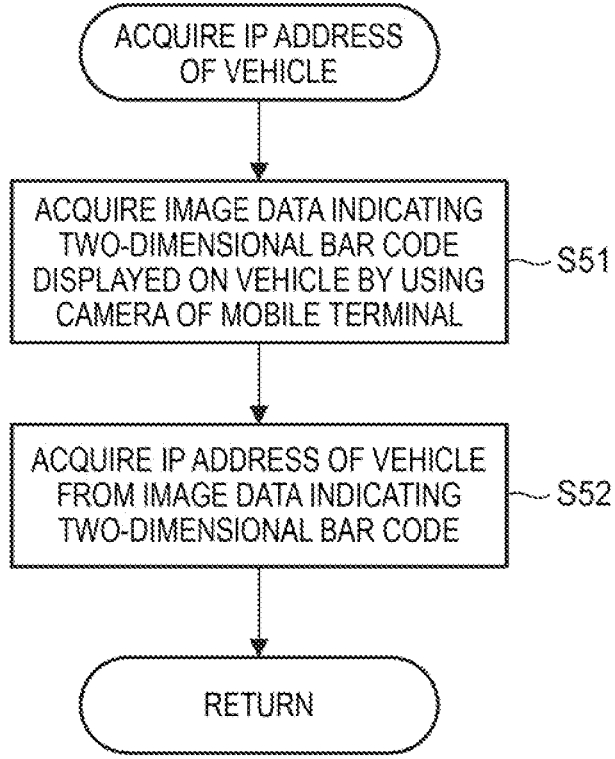
FIG. 18 is a flowchart for describing a process of acquiring an IP address of a vehicle.

As shown in FIG. 15, in step S46, the mobile terminal 2 acquires the IP address of the vehicle 3a. Specifically, as shown in FIG. 18, in step S51, the user U captures a two-dimensional bar code (for example, a QR code or the like) displayed on the vehicle 3a by using the camera 24 of the mobile terminal 2. Thereafter, the control unit 20 of the mobile terminal 2 acquires image data indicating the two-dimensional bar code acquired by the camera 24. Then, in step S52, the control unit 20 acquires information (128 bits) regarding the IP address of the vehicle 3a included in the two-dimensional pattern by analyzing the image data indicating the two-dimensional pattern.

Then, referring back to FIG. 15, in step S47, the mobile terminal 2 transmits a door unlock signal, which is for making a request for the unlocking of the door 39a of the vehicle 3a, to the vehicle 3a through the communication network 5. Specifically, the mobile terminal 2 transmits the door unlock signal to the vehicle 3a by using the IP address of the mobile terminal 2 as a source address and the IP address of the vehicle 3a as a destination address. In this manner, the vehicle 3a can specify the IP address of the mobile terminal 2 by referring to the source address of the door unlock signal.

Then, the vehicle 3a determines whether or not to allow the unlocking of the door 39a based on the vehicle reservation management table stored in the storage device 33a, the IP address of the mobile terminal 2, and the information regarding the current date and time (step S48). Specifically, the vehicle 3a determines whether or not the IP address corresponding to the user ID used to reserve the vehicle 3a in the reserved time range including the current date and time matches the IP address of the mobile terminal 2. Here, when the two IP addresses match each other, the vehicle 3a determines that the unlocking of the door 39a is allowed (YES in step S48). On the other hand, when the two IP addresses do not match each other, the vehicle 3a determines that the unlocking of the door 39a is not allowed (NO in step S48).

When the determination result in step S48 is YES, the control unit 30a of the vehicle 3a transmits a door unlock signal to the door lock control circuit 36a. The door lock control circuit 36a unlocks the door 39a by driving the door lock mechanism 37a in response to the door unlock signal. In this manner, the door of the vehicle 3a is unlocked (step S50). On the other hand, when the determination result in step S48 is NO, the vehicle 3a outputs a warning sound from the speaker 38a (step S49).

As described above, according to the method of unlocking the door of the vehicle 3a according to the present embodiment, it is determined whether or not to allow the unlocking of the door 39a of the vehicle 3a by using the IP address of the mobile terminal 2. For this reason, the mobile terminal 2 itself can be used as a key for unlocking the door 39a of the vehicle 3a. Therefore, the user U does not need to bring a physical key (card key or the like), and can unlock the door 39a only with the mobile terminal 2. In addition, without preparing a physical key corresponding to each vehicle when using a plurality of vehicles, the user U can unlock the doors of the plurality of vehicles. Therefore, it is possible to provide a door unlocking method capable of improving the convenience of the user U and providing the user U with a new car sharing experience or car rental experience.

In addition, after the process of step S50, the mobile terminal 2 and the vehicle 3a know each other's IP addresses, so that communication between the mobile terminal 2 and the vehicle 3a is established. In this manner, the mobile terminal 2 is communicably connected to the vehicle 3a through the communication network 5. Therefore, the mobile terminal 2 can lock the door 39a by transmitting a door lock signal, which is for making a request for the locking of the door 39a of the vehicle 3a, to the vehicle 3a. On the other hand, the mobile terminal 2 can unlock the door 39a by transmitting a door unlock signal, which is for making a request for the unlocking of the door 39a of the vehicle 3a, to the vehicle 3a. In addition, through the establishment of communication between the mobile terminal 2 and the vehicle 3a, the user U can control the driving of the vehicle 3a by using the mobile terminal 2. For example, the user U can activate the vehicle 3a by using the mobile terminal 2. In addition, the user U can end the activation of the vehicle 3a by using the mobile terminal 2.

Figure 19:
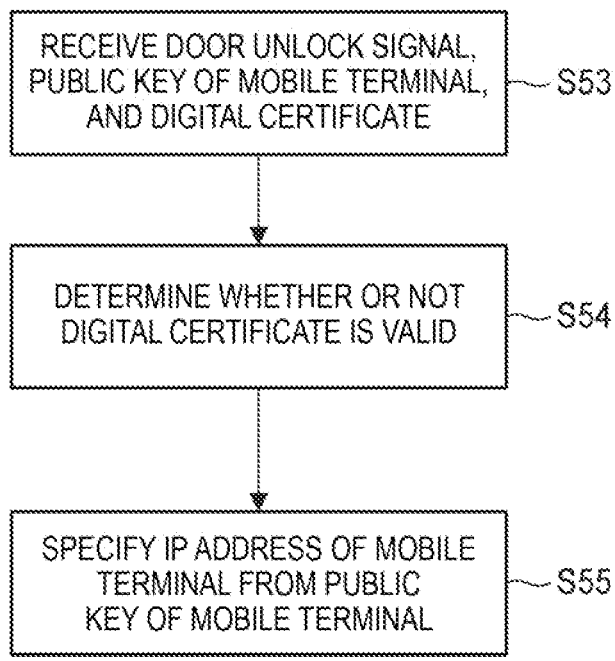
FIG. 19 is a flowchart for describing a process that is an alternative to the process B shown in FIG. 15.

In addition, the process B including steps S46 and S47 shown in FIG. 15 may be replaced with a process shown in FIG. 19. In this regard, a process that is an alternative to the process B will be described below with reference to FIG. 19. FIG. 19 is a flowchart for describing a process that is an alternative to the process B shown in FIG. 15.

As shown in FIG. 19, in step S53, the mobile terminal 2 transmits a door unlock signal, a public key of the mobile terminal 2, and a digital certificate associated with the public key of the mobile terminal 2 to the vehicle 3a through the near field communication (NFC). For example, the user U connects the mobile terminal 2 to the NFC interface (a part of the network interface 35a) of the vehicle 3a, so that the door unlock signal, the public key, and the digital certificate are transmitted from the mobile terminal 2 to the vehicle 3a.

Then, the vehicle 3a determines whether or not the received digital certificate is valid (step S54). In particular, the vehicle 3a checks the owner information, the issuer information, and the digital signature (hash value) of the digital certificate. Then, the vehicle 3a checks the expiration date of the digital certificate. Thereafter, the vehicle 3a determines the reliability of the issuer of the digital certificate. Here, the issuer of the digital certificate may be an intermediate certificate authority.

Then, after determining that the digital certificate is valid, the vehicle 3a specifies the IP address of the mobile terminal 2 from the public key of the mobile terminal 2 (step S55). Specifically, the vehicle 3a generates a hash value based on the public key (256 bits) of the mobile terminal 2 and a predetermined hash function, and then specifies the IP address of the mobile terminal 2 from the generated hash value. In this regard, when the hash value is 256 bits, the first 128 bits of the hash value are determined as the IP address of the mobile terminal 2. Thus, since it is possible to specify the IP address of the mobile terminal 2, the vehicle 3a can determine whether or not to allow the unlocking of the door of the vehicle 3a based on the specified IP address of the mobile terminal 2 and the vehicle reservation management table.

(Vehicle Door Unlocking Method According to a Modification Example)

Figure 20:
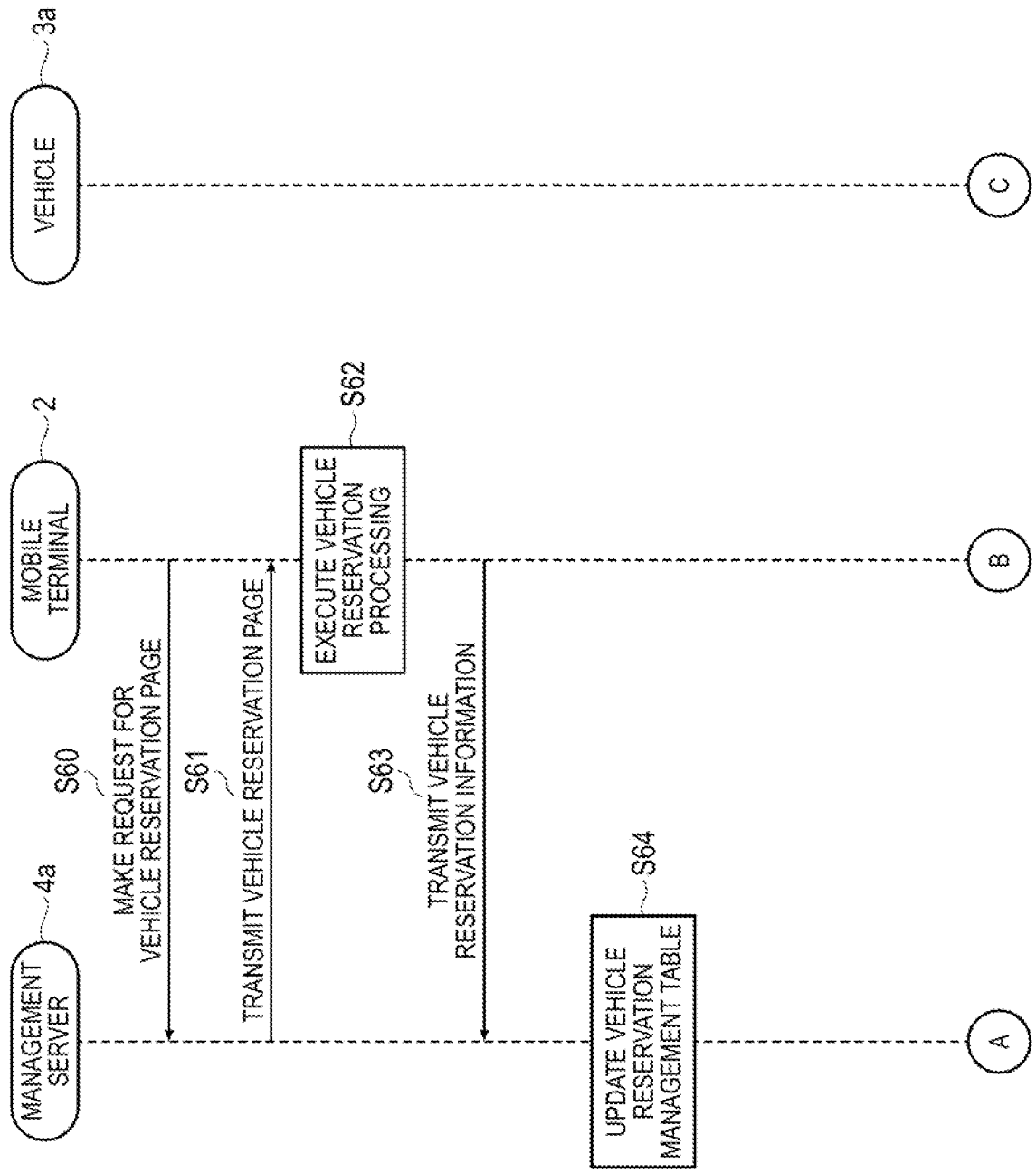
FIG. 20 is a sequence diagram for describing a vehicle door unlocking method according to a modification example (case 1).
Figure 21:
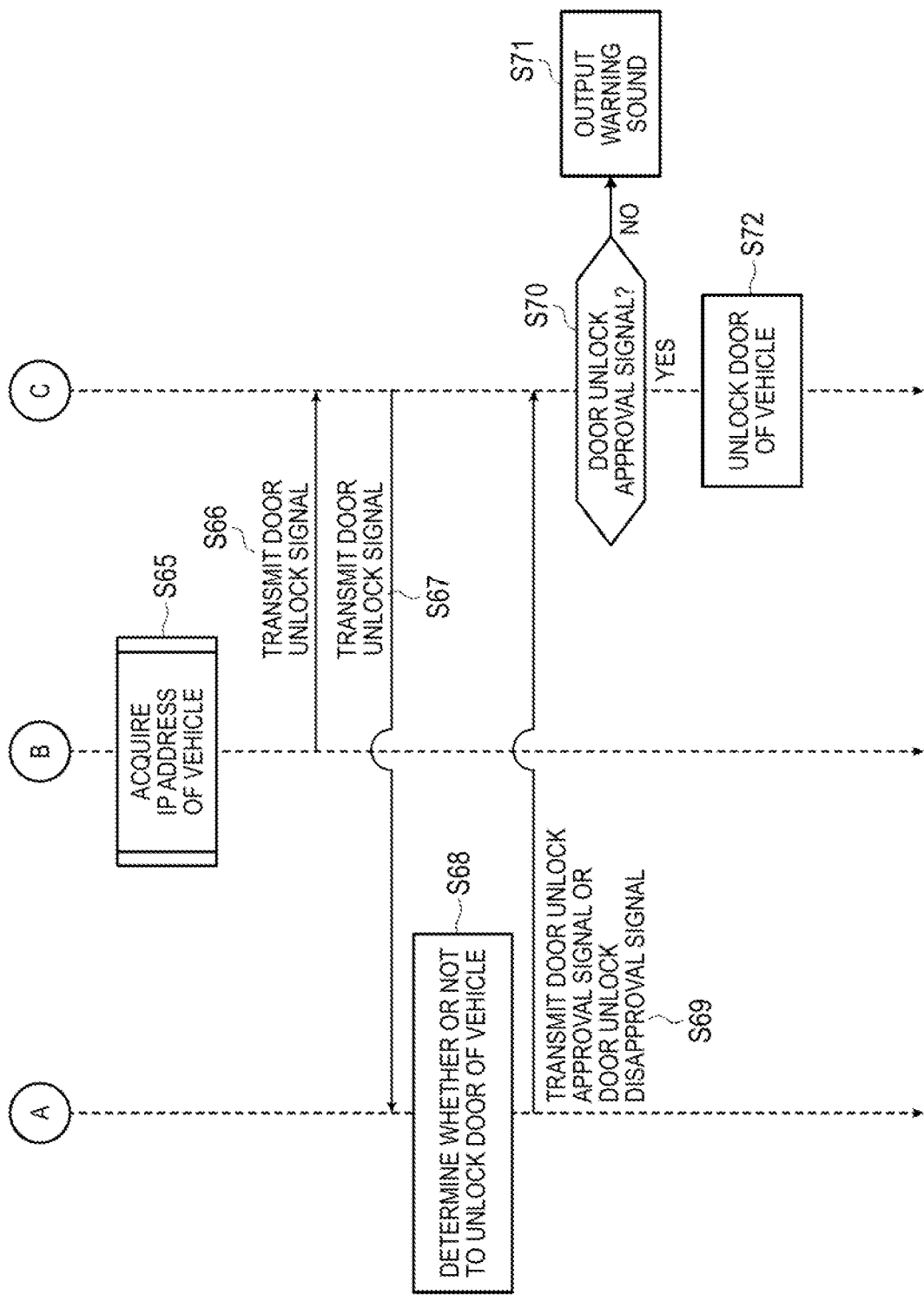
FIG. 21 is a sequence diagram for describing a vehicle door unlocking method according to a modification example (case 2).

Next, a method of unlocking the door of the vehicle 3a according to a modification example will be described below with reference to FIGS. 20 and 21. FIGS. 20 and 21 are sequence diagrams for describing the method of unlocking the door of the vehicle 3a according to the modification example. The door unlocking method according to the modification example is different from the door unlocking method according to the present embodiment in that the management server 4a executes a process of determining whether or not to unlock the door of the vehicle 3a. In addition, in explaining the door unlocking method according to the modification example, the same processing as the processing of the door unlocking method of the present embodiment will not be repeatedly described.

As shown in FIG. 20, the processes of steps S60 to S64 are the same as the processes of steps S40 to S44 shown in FIG. 14, and accordingly no particular description thereof will be given. In addition, in the door unlocking method shown in FIG. 14, after the process of step S44, the management server 4a transmits the vehicle reservation management table associated with the vehicle 3a to the vehicle 3a. On the other hand, in the door unlocking method according to the modification example, the management server 4a does not transmit the vehicle reservation management table to the vehicle 3a.

Then, as shown in FIG. 21, in step S65, the mobile terminal 2 acquires the IP address of the vehicle 3a. Thereafter, the mobile terminal 2 transmits a door unlock signal to the vehicle 3a through the communication network 5 by using the IP address of the mobile terminal 2 as a source address and the IP address of the vehicle 3a as a destination address (step S66). Here, the process of step S65 is the same as the process of step S46 shown in FIG. 15. In addition, each process shown in FIG. 19 may be applied instead of the processes of steps S46 and S47.

Then, the vehicle 3a transmits the door unlock signal and the information indicating the IP address of the mobile terminal 2 to the management server 4a through the communication network 5 (step S67). Thereafter, the management server 4a specifies a vehicle ID of the vehicle 3a based on the IP address of the vehicle 3a, which is a destination address, and the vehicle management table. Then, the management server 4a reads out a vehicle reservation management table of the vehicle 3a based on the vehicle ID of the vehicle 3a. Thereafter, the management server 4a determines whether or not to allow the unlocking of the door 39a based on the vehicle reservation management table of the vehicle 3a stored in the storage device, the IP address of the mobile terminal 2, and the information regarding the current date and time (step S68). Specifically, the management server 4a determines whether or not the IP address corresponding to the user ID used to reserve the vehicle 3a in the reserved time range including the current date and time matches the IP address of the mobile terminal 2. Here, when the two IP addresses match each other, the management server 4a determines that the unlocking of the door 39a is allowed, and then transmits a door unlock approval signal to the vehicle 3a. On the other hand, when the two IP addresses do not match each other, the management server 4a determines that the unlocking of the door 39a is not allowed, and then transmits a door unlock disapproval signal to the vehicle 3a (step S69).

Thereafter, when the signal transmitted from the management server 4a is a door unlock approval signal (YES in step S70), the control unit 30a of the vehicle 3a transmits a door unlock signal to the door lock control circuit 36a. The door lock control circuit 36a unlocks the door 39a by driving the door lock mechanism 37a in response to the door unlock signal. In this manner, the door of the vehicle 3a is unlocked (step S72). On the other hand, when the signal transmitted from the management server 4a is a door unlock disapproval signal (NO in step S70), the vehicle 3a outputs a warning sound from the speaker 38a (step S71).

As described above, also in the vehicle door unlocking method according to the modification example, it is determined whether or not to allow the unlocking of the door 39a of the vehicle 3a by using the IP address of the mobile terminal 2. For this reason, the mobile terminal 2 itself can be used as a key for unlocking the door 39a of the vehicle 3a. Therefore, the user U does not need to bring a physical key (card key or the like), and can unlock the door 39a only with the mobile terminal 2. In addition, without preparing a physical key corresponding to each vehicle when using a plurality of vehicles, the user U can unlock the doors of the plurality of vehicles. Therefore, it is possible to provide a door unlocking method capable of improving the convenience of the user U and providing the user U with a new car sharing experience or car rental experience. In addition, in the door unlocking method according to the modification example, it is not necessary to store the vehicle reservation management table in the vehicle $3a$, and the vehicle $3a$ does not need to determine whether or not to unlock the door.

In addition, when the vehicle reservation management table shown in FIG. 17 does not include IP address information, the management server $4a$ may execute the door unlock determination process defined in step S68 by referring to both the user management table and the vehicle reservation management table. In this case, first, the management server $4a$ specifies the user ID of the user U corresponding to the IP address of the mobile terminal 2 based on the IP address of the mobile terminal 2 and the user management table. Thereafter, the management server $4a$ may determine whether or not the user ID used to reserve the vehicle $3a$ in the reserved time range including the current date and time matches the specified user ID based on the specified user ID and the vehicle reservation management table.

(Room Door Unlocking System)

Figure 22:
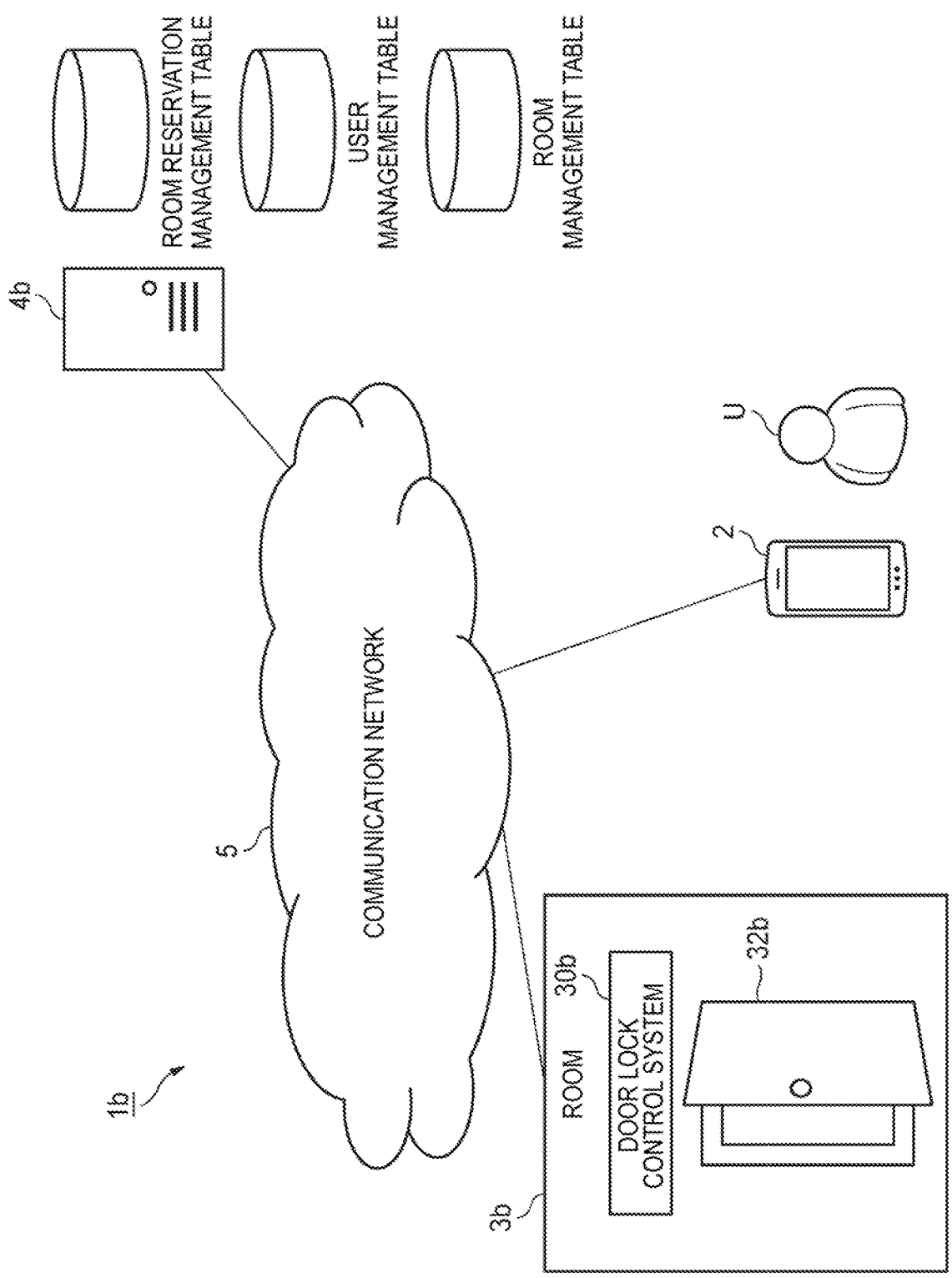
FIG. 22 is a diagram showing a room door unlocking system according to the present embodiment.

Hereinafter, a door unlocking system $1b$ for a room $3b$ according to the present embodiment will be described with reference to the diagrams. First, the door unlocking system $1b$ will be described with reference to FIG. 22. As shown in FIG. 22, the door unlocking system $1b$ includes the mobile terminal 2 associated with the user U, the room $3b$, and a management server $4b$. The mobile terminal 2, the room $3b$, and the management server $4b$ are communicably connected to the communication network 5 wirelessly or by wire. The mobile terminal 2 and the room $3b$ (particularly, a door lock control system $30b$) may be connected to the communication network 5 through an access point, such as a wireless LAN router or a wireless base station. The management server $4b$ may be connected to a router through a wired cable.

Figure 23:
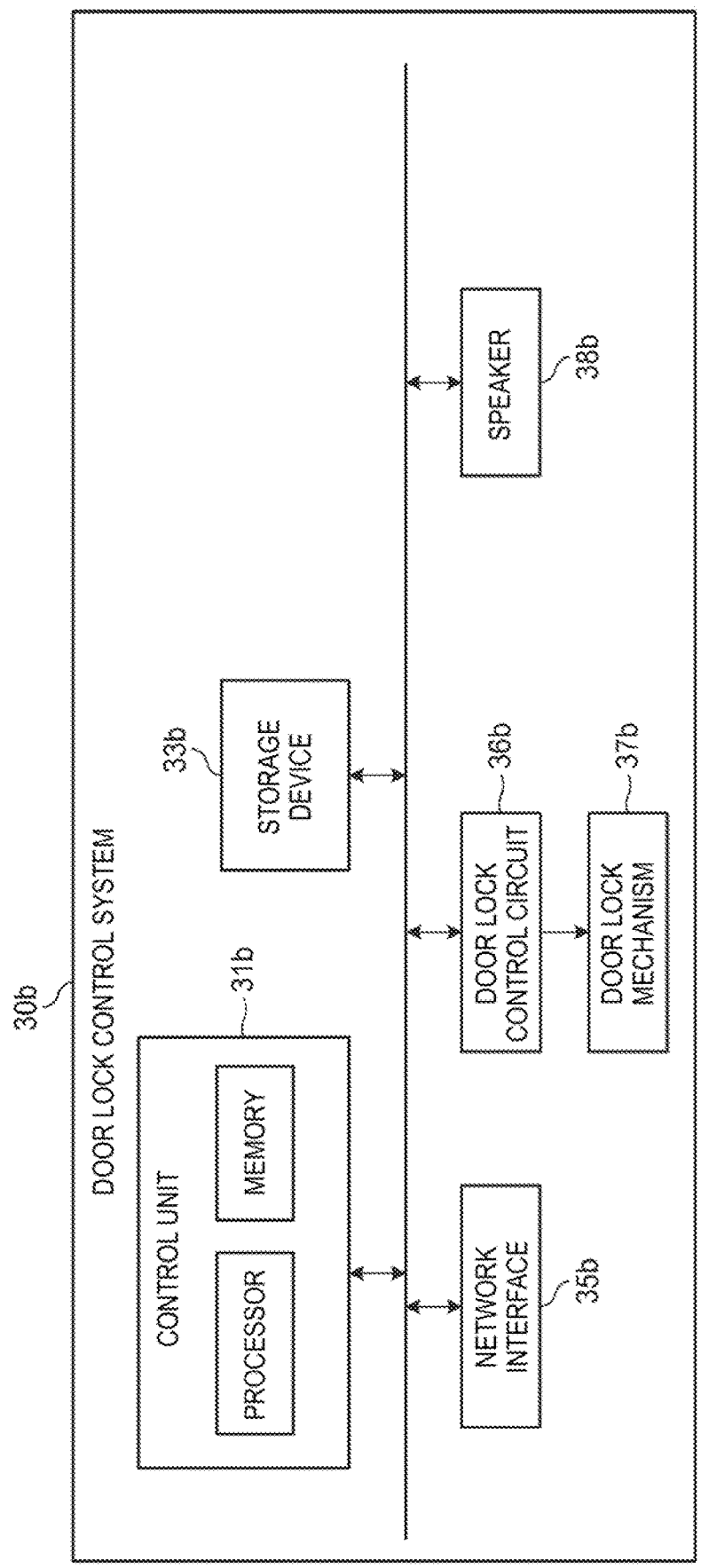
FIG. 23 is a diagram showing an example of the hardware configuration of a door lock control system.

Next, the hardware configuration of the door lock control system $30b$ provided in the room $3b$ will be described below with reference to FIG. 23. FIG. 23 is a diagram showing an example of the hardware configuration of the door lock control system $30b$. The room $3b$ is a room in a predetermined facility, and in particular, the type of facility is not limited. For example, the room $3b$ according to the present embodiment is a room in a hotel, a room in a private house room, or a conference room. The room $3b$ may be, for example, a room used to provide a room sharing service. The room $3b$ includes a door $32b$ and the door lock control system $30b$ configured to control locking or unlocking of the door $32b$.

As shown in FIG. 23, the door lock control system $30b$ includes a control unit $31b$, a storage device $33b$, a network interface $35b$, a door lock control circuit $36b$, a door lock mechanism $37b$, and a speaker $38b$. These components of the door lock control system $30b$ are directly or indirectly connected to each other through a bus.

The control unit $31b$ includes one or more processors and one or more memories. The memory is configured to store computer-readable instructions. For example, the memory may be configured by a ROM and a RAM. The processor includes, for example, at least one of a CPU, an MPU, and a GPU. The CPU may be configured by a plurality of CPU cores. The GPU may be configured by a plurality of GPU cores. The processor may be configured to load a program, which is designated from various programs read into the storage device $33b$ or the ROM, to the RAM and execute various processes in cooperation with the RAM. In particular, the door lock control system $30b$ is configured to execute a part of the processing of the vehicle door unlocking method for the room $3b$ according to the present embodiment by executing the program stored in the memory by the processor.

The storage device $33b$ is, for example, a storage device (storage) such as an HDD or an SSD, and is configured to store programs or various kinds of data. In particular, the storage device $33b$ may be configured to store a room reservation management table (see FIG. 27). The network interface $35b$ is configured to connect the door lock control system $30b$ to the communication network 5.

The network interface $35b$ is configured to connect the door lock control system $30b$ to the communication network 5. The network interface $35b$ may include various processing circuits and antennas for communicating with a wireless router or a wireless base station. Wireless communication standards include, for example, at least one of Wi-Fi, Bluetooth, ZigBee, LPWA, 5th generation mobile communication system (5G), and NFC.

The door lock control circuit $36b$ is configured to control the door lock mechanism $37b$ in response to an instruction signal from the control unit $31b$. The door lock mechanism $37b$ is provided on the door $32b$ and is configured to lock or unlock the door $32b$. For example, the door lock control circuit $36b$ is configured to lock or unlock the door $32b$ by driving the door lock mechanism $37b$ provided on the door $32b$ in response to a door lock signal/door unlock signal transmitted from the control unit $31b$.

The management server $4b$ has the same configuration as the management server 4 shown in FIG. 3. In this regard, the storage device of the management server $4b$ stores a user management table and a room management table (see FIG. 26) and a room reservation management table (see FIG. 27). In the present embodiment, it is assumed that the management server $4b$ also functions as a WEB server. The management server $4b$ means one or more servers associated with a provider that manages room use reservations.

In the present embodiment, the room $3b$ (door lock control system $30b$) has an IP address unique to the room $3b$ (door lock control system $30b$), similarly to the IP address of the mobile terminal 2. That is, the IP address of the room $3b$ is not an IP address issued by the ISP but an IP address generated by the room $3b$ itself. The IP address of the room $3b$ is, for example, an IP address (128 bits) corresponding to IPv6 displayed in 32 hexadecimal digits. In addition, the IP address of the room $3b$ may be generated based on the public key of the room $3b$ authenticated by the certificate authority. In addition, the public key of the room $3b$ may be authenticated by the certificate authority. As described above, the IP address of the room $3b$ is an IP address unique to the room $3b$ and an IP address authenticated by the certificate authority.

(Room Door Unlocking Method According to the Present Embodiment)

Figure 24:
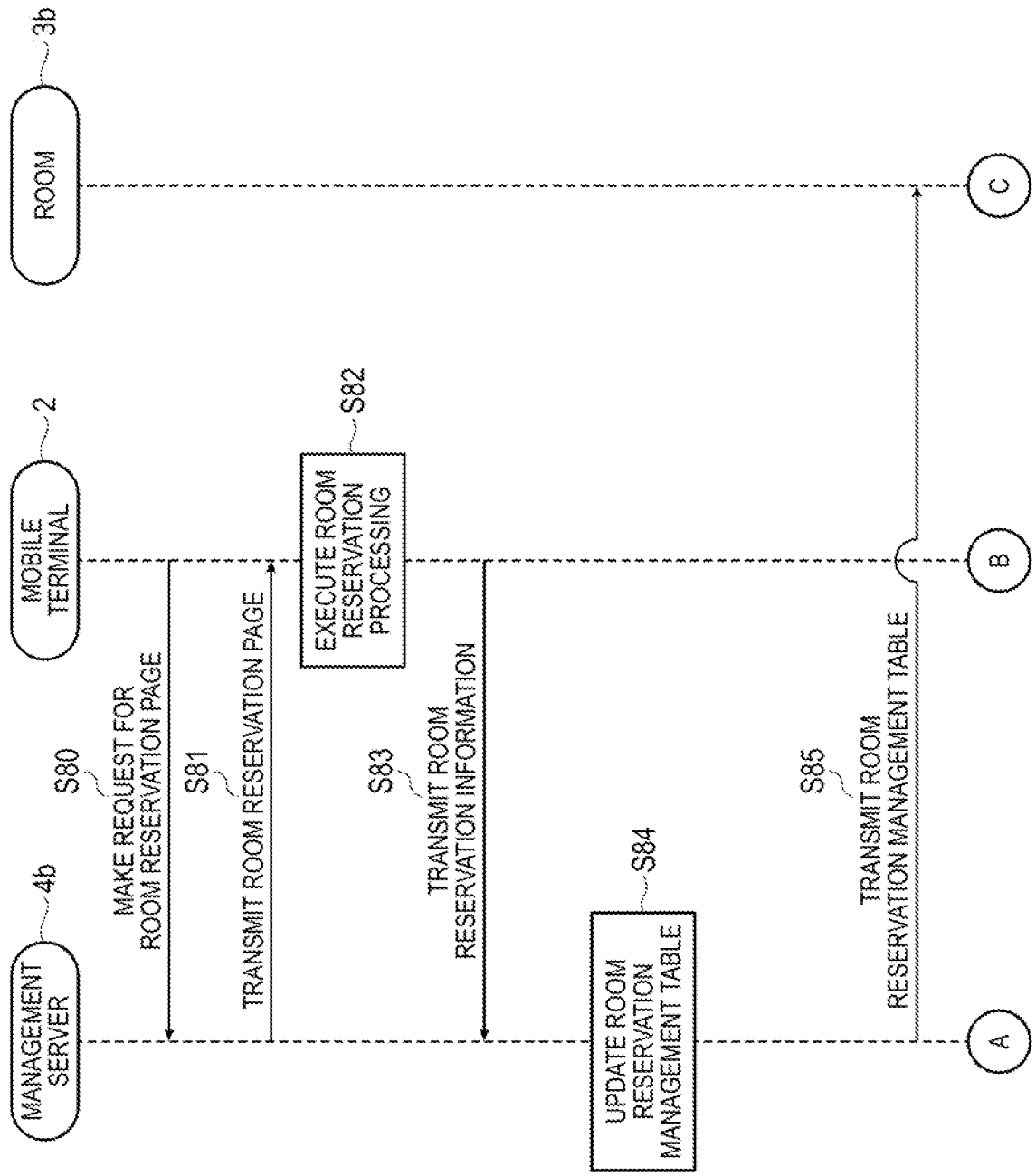
FIG. 24 is a sequence diagram for describing a room door unlocking method according to the present embodiment (case 1).
Figure 25:
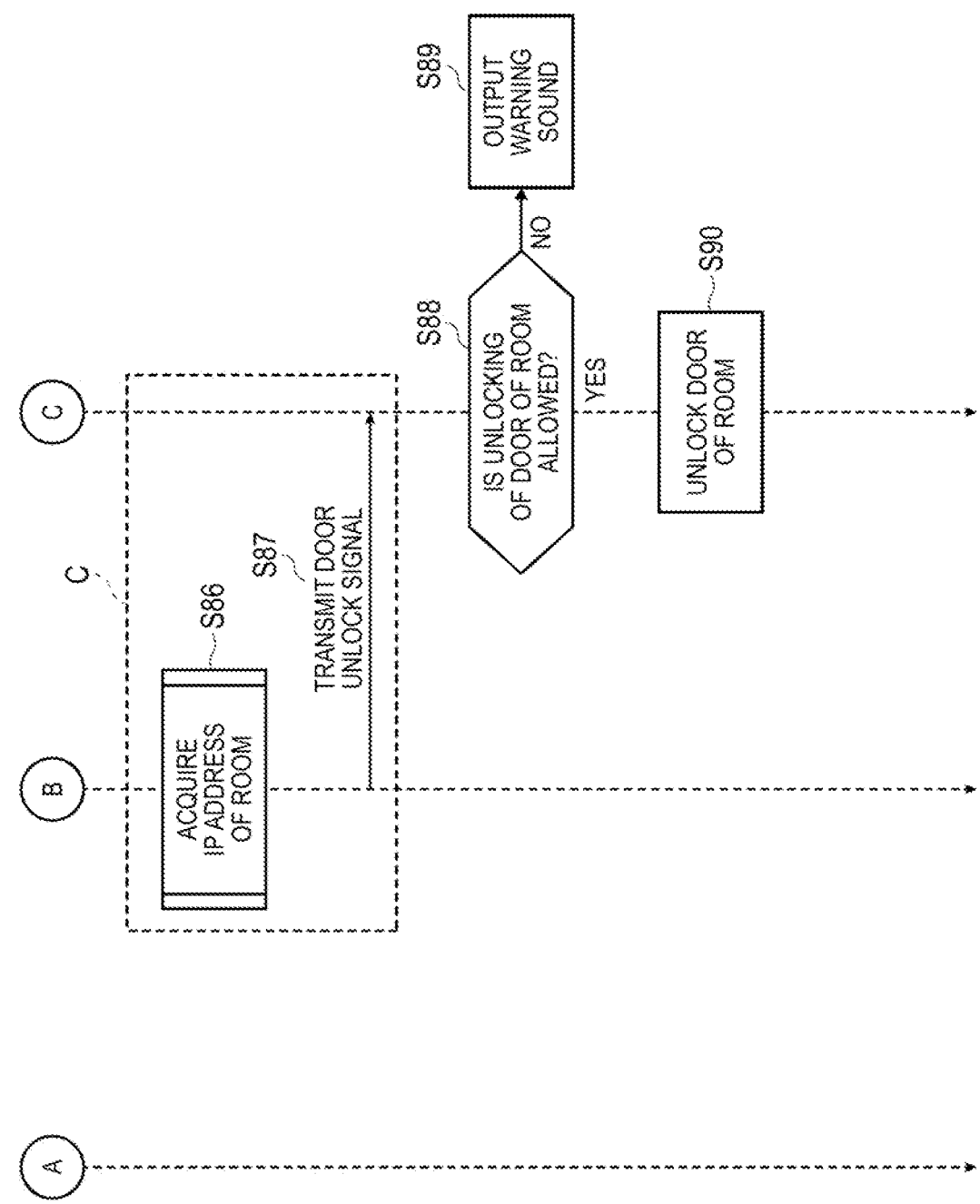
FIG. 25 is a sequence diagram for describing a room door unlocking method according to the present embodiment (case 2).

Next, a method of unlocking the door of the room $3b$ according to the present embodiment will be described below with reference to FIGS. 24 and 25. FIGS. 24 and 25 are sequence diagrams for describing the method of unlocking the door of the room $3b$. As shown in FIG. 24, first, the mobile terminal 2 transmits a request signal, which is for making a request for a room reservation page for reserving the use of the room $3b$, to the management server $4b$ through the communication network 5 (step S80). Here, it should be noted that the management server 4b also functions as a WEB server. In particular, the WEB browser of the mobile terminal 2 transmits the request signal to the management server 4b according to a communication protocol, such as an HTTP. Then, in response to the request signal transmitted from the mobile terminal 2, the management server 4b transmits a room reservation page (WEB page) to the mobile terminal 2 through the communication network 5 (step S81). In addition, before and after executing the process of step S80, a login process for logging in to an online site (particularly, an online site for room use reservation) provided by the management server 4b (WEB server) may be executed.

Then, in step S82, the user U inputs room reservation information for making a reservation for using the room 3b to the mobile terminal 2 through the input operation unit 27 of the mobile terminal 2. The room reservation information includes, for example, information for specifying the room 3b, which is a reserved room, and information regarding the date and time of use of the room 3b. In this manner, the mobile terminal 2 executes the room reservation processing.

Then, in step S83, the mobile terminal 2 transmits the room reservation information input to the mobile terminal 2 to the management server 4b. Thereafter, the management server 4b updates the room reservation management table (see FIG. 27) associated with the room 3b based on the room reservation information transmitted from the mobile terminal 2, the user management table, and the room management table (step S84). In this regard, the management server 4b specifies a room ID corresponding to the room 3b based on the information for specifying the room 3b included in the room reservation information and the room management table. Then, the management server 4b reads out a room reservation table associated with the room ID of the room 3b. Thereafter, the management server 4b updates the room reservation management table relevant to the room 3b with reference to the information regarding the use date and the use time range of the room 3b and the information regarding the user U (user ID, IP address of the mobile terminal 2, and the like) included in the room reservation information.

In addition, the user management table and the room management table (see FIG. 26) and the room reservation management table (see FIG. 27) are examples of management tables. These management tables are stored in the storage device of the management server 4b. The user management table includes a plurality of pieces of user ID information (user identification information) indicating the IDs of a plurality of users, IP address information indicating a plurality of IP addresses unique to a plurality of mobile terminals, and a plurality of pieces of user attribute information (contact information, credit information, and the like). The room management table includes room ID information indicating the IDs of a plurality of rooms, IP address information indicating the IP addresses of a plurality of rooms, and a plurality of pieces of room attribute information (room numbers, locations, and the like). In the user management table, user IDs, IP addresses, and user attribute information are associated with each other. In particular, each of the plurality of pieces of user ID information is associated with one of the plurality of pieces of IP address information and one of the plurality of pieces of user attribute information. Similarly, in the room management table, room IDs, IP addresses, and room attribute information are associated with each other.

In addition, the room reservation management table includes information regarding the use date and use time range of the room 3b, user ID information, and IP address information corresponding to the user ID. In the room reservation management table, these pieces of information are associated with each other. For example, the user ID of the user U, the IP address of the mobile terminal 2 associated with the user U, and the information regarding the use date and the use time range in which the user U uses the room 3b are registered in the room reservation management table.

Then, in step S85, the management server 4b transmits the room reservation management table to the room 3b (door lock control system 30b) through the communication network 5. Thereafter, the room reservation management table is stored in the storage device 33b of the door lock control system 30b. In addition, instead of the room reservation management table, the management server 4b may transmit information regarding the use date and use time range of the room 3b and information regarding the user U (user ID, IP address of the mobile terminal 2, and the like) to the door lock control system 30b. In this case, the door lock control system 30b may update the room reservation management table stored in the storage device 33b based on the information transmitted from the management server 4b.

In FIG. 24, a series of processes relevant to room use reservation through the mobile terminal 2 has been described. Next, a process of unlocking the door 32b of the room 3b, which is a reserved room, will be described below with reference to FIG. 25. In the process from step S86, it is assumed that the user U is present in the vicinity of the door 32b.

Figure 28:
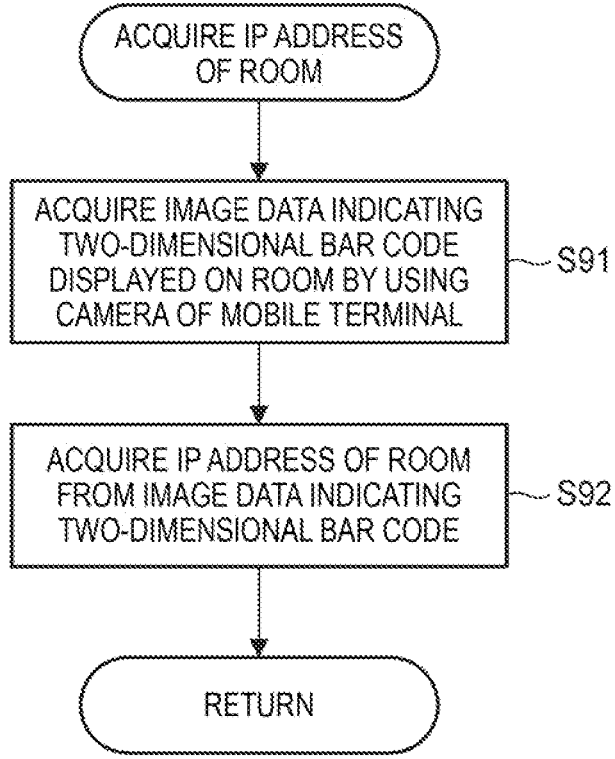
FIG. 28 is a flowchart for describing a process of acquiring an IP address of a room.

As shown in FIG. 25, in step S86, the mobile terminal 2 acquires the IP address of the room 3b. Specifically, as shown in FIG. 28, in step S91, the user U captures a two-dimensional bar code (for example, a QR code or the like) displayed on the door 32b by using the camera 24 of the mobile terminal 2. Thereafter, the control unit 20 of the mobile terminal 2 acquires image data indicating the two-dimensional bar code acquired by the camera 24. Then, in step S92, the control unit 20 acquires information (128 bits) regarding the IP address of the room 3b included in the two-dimensional pattern by analyzing the image data indicating the two-dimensional pattern.

Then, referring back to FIG. 25, in step S87, the mobile terminal 2 transmits a door unlock signal, which is for making a request for the unlocking of the door 32b, to the door lock control system 30b through the communication network 5. Specifically, the mobile terminal 2 transmits the door unlock signal to the door lock control system 30b by using the IP address of the mobile terminal 2 as a source address and the IP address of the room 3b as a destination address. In this manner, the door lock control system 30b can specify the IP address of the mobile terminal 2 by referring to the source address of the door unlock signal.

Then, the door lock control system 30b determines whether or not to allow the unlocking of the door 32b based on the room reservation management table stored in the storage device 33b, the IP address of the mobile terminal 2, and the information regarding the current date and time (step S88). Specifically, the door lock control system 30b determines whether or not the IP address corresponding to the user ID used to reserve the room 3b in the reserved time range including the current date and time matches the IP address of the mobile terminal 2. Here, when the two IP addresses match each other, the door lock control system 30b determines that the unlocking of the door 32b is allowed (YES in step S88). On the other hand, when the two IP addresses do not match each other, the door lock control system 30b determines that the unlocking of the door 32b is not allowed (NO in step S88).

When the determination result in step S88 is YES, the control unit 31b of the door lock control system 30b transmits a door unlock signal to the door lock control circuit 36b. The door lock control circuit 36b unlocks the door 32b by driving the door lock mechanism 37b in response to the door unlock signal. In this manner, the door of the room 3b is unlocked (step S90). On the other hand, when the determination result in step S88 is NO, the door lock control system 30b outputs a warning sound from the speaker 38b (step S89).

As described above, according to the method of unlocking the door of the room 3b according to the present embodiment, it is determined whether or not to allow the unlocking of the door 32b of the room 3b by using the IP address of the mobile terminal 2. For this reason, the mobile terminal 2 itself can be used as a key for unlocking the door 32b. Therefore, the user U does not need to bring a physical key (card key or the like), and can unlock the door 32b only with the mobile terminal 2. In addition, without preparing a physical key corresponding to each room when using a plurality of rooms, the user U can unlock the doors of the plurality of rooms. Therefore, it is possible to provide a door unlocking method capable of improving the convenience of the user U and providing the user U with a new room sharing experience.

In addition, after the process of step S90, the mobile terminal 2 and the door lock control system 30b know each other's IP addresses, so that communication between the mobile terminal 2 and the door lock control system 30b is established. In this manner, the mobile terminal 2 is communicably connected to the door lock control system 30b through the communication network 5. Therefore, the mobile terminal 2 can lock the door 32b by transmitting a door lock signal, which is for making a request for the locking of the door 32b, to the door lock control system 30b. On the other hand, the mobile terminal 2 can unlock the door 32b by transmitting a door unlock signal, which is for making a request for the unlocking of the door 32b, to the door lock control system 30b.

Figure 29:
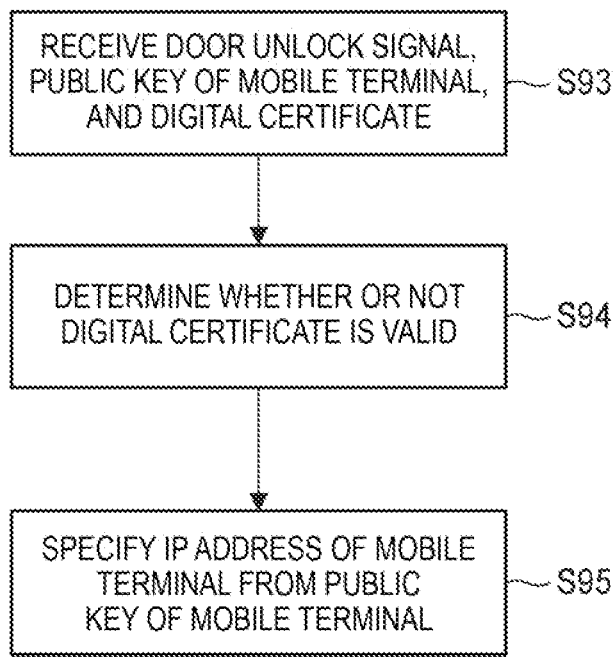
FIG. 29 is a flowchart for describing a process that is an alternative to the process C shown in FIG. 25.

In addition, the process C including steps S86 and S87 shown in FIG. 25 may be replaced with a process shown in FIG. 29. In this regard, a process that is an alternative to the process C will be described below with reference to FIG. 29. FIG. 29 is a flowchart for describing a process that is an alternative to the process C shown in FIG. 25.

As shown in FIG. 29, in step S93, the mobile terminal 2 transmits a door unlock signal, a public key of the mobile terminal 2, and a digital certificate associated with the public key of the mobile terminal 2 to the door lock control system 30b through the near field communication (NFC). For example, the user U connects the mobile terminal 2 to the NFC interface (a part of the network interface 35a) of the door lock control system 30b, so that the door unlock signal, the public key, and the digital certificate are transmitted from the mobile terminal 2 to the door lock control system 30b.

Then, the door lock control system 30b determines whether or not the received digital certificate is valid (step S94). In particular, the door lock control system 30b checks the owner information, the issuer information, and the digital signature (hash value) of the digital certificate. Then, the door lock control system 30b checks the expiration date of the digital certificate. Thereafter, the door lock control system 30b determines the reliability of the issuer of the digital certificate. Here, the issuer of the digital certificate may be an intermediate certificate authority.

Then, after determining that the digital certificate is valid, the door lock control system 30b specifies the IP address of the mobile terminal 2 from the public key of the mobile terminal 2 (step S95). Specifically, the door lock control system 30b generates a hash value based on the public key (256 bits) of the mobile terminal 2 and a predetermined hash function, and then specifies the IP address of the mobile terminal 2 from the generated hash value. In this regard, when the hash value is 256 bits, the first 128 bits of the hash value are determined as the IP address of the mobile terminal 2. Thus, since it is possible to specify the IP address of the mobile terminal 2, the door lock control system 30b can determine whether or not to allow the unlocking of the door of the room 3b based on the specified IP address of the mobile terminal 2 and the room reservation management table.

(Room Door Unlocking Method According to a Modification Example)

Figure 30:
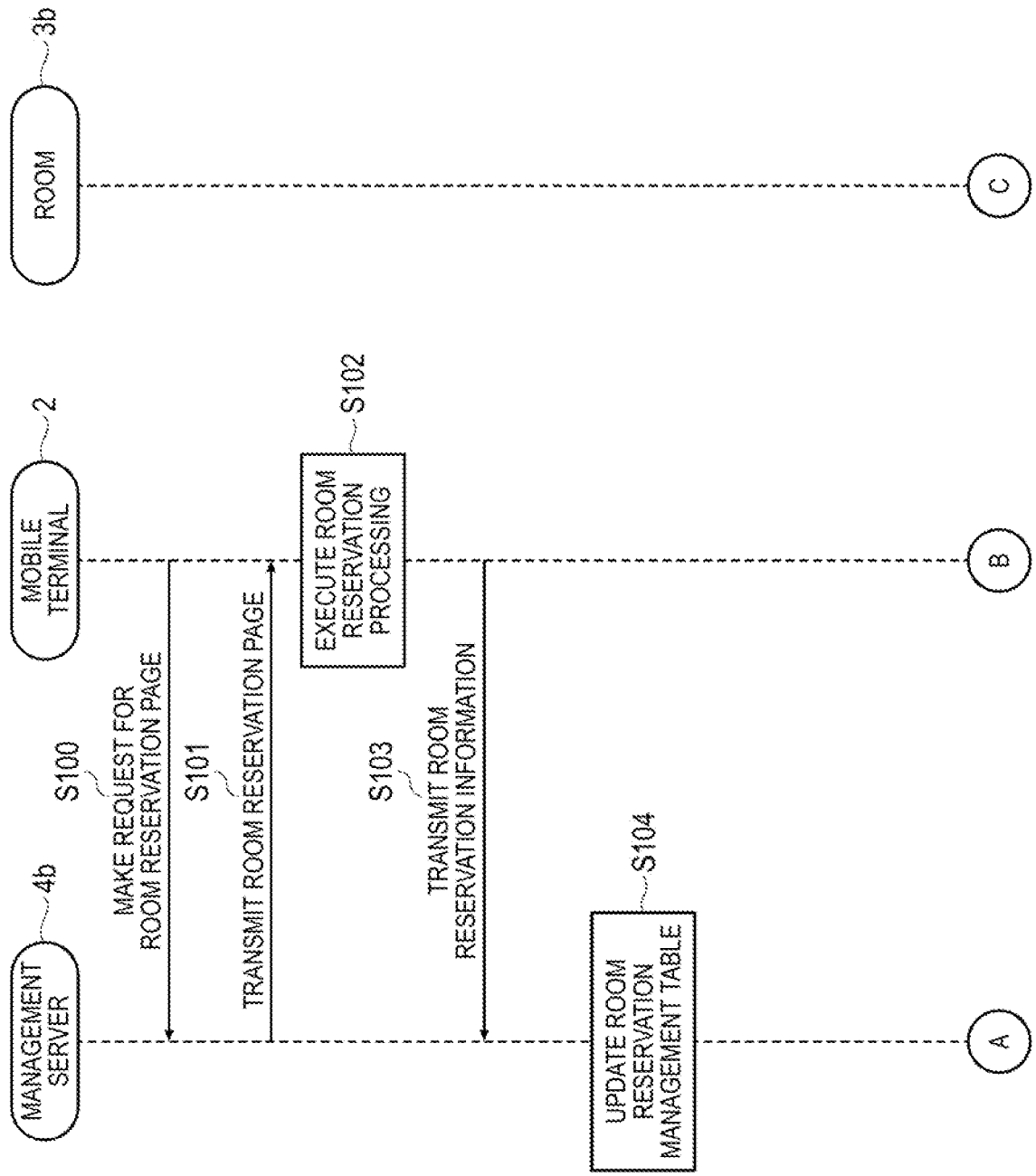
FIG. 30 is a sequence diagram for describing a room door unlocking method according to a modification example (case 1).
Figure 31:
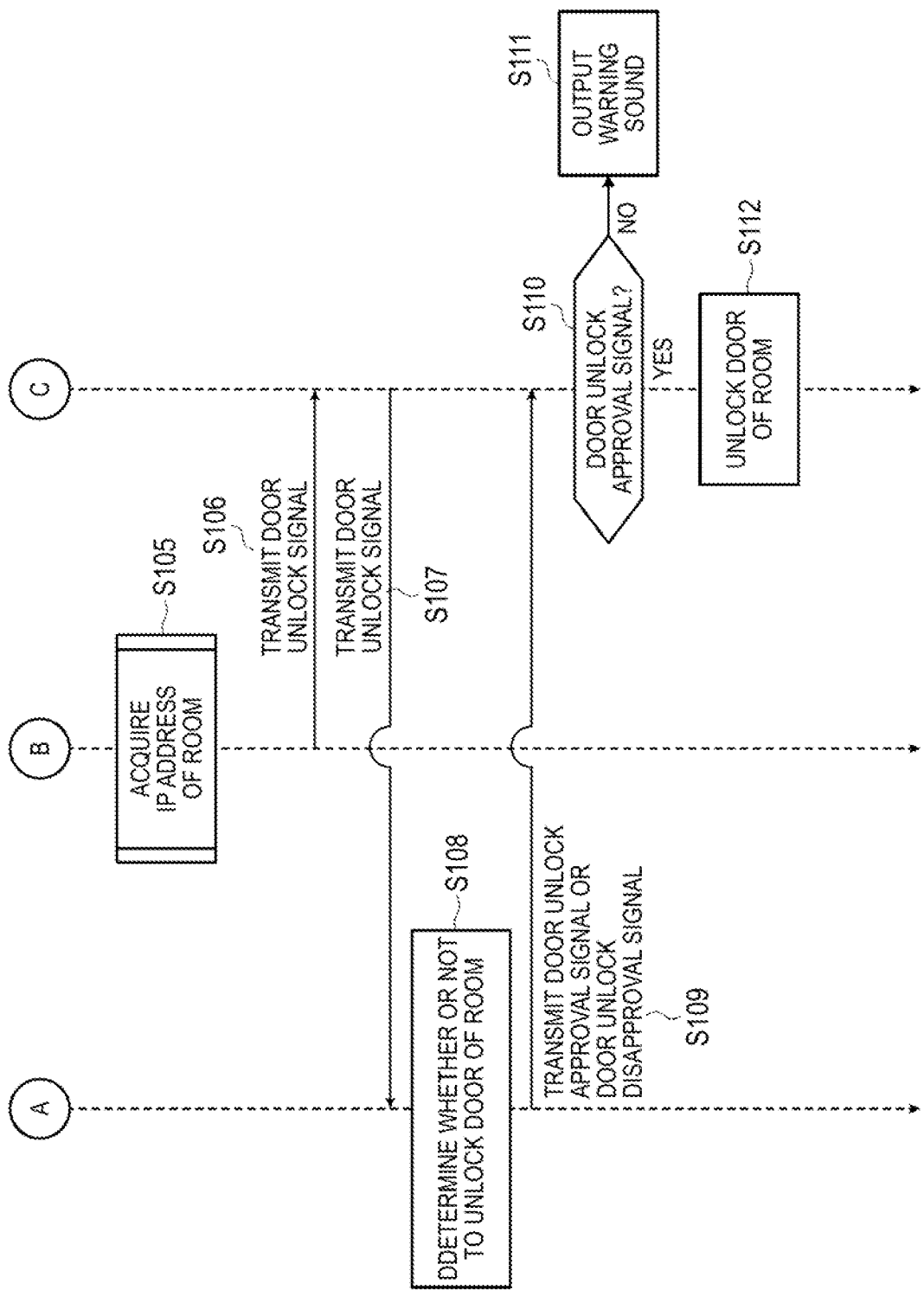
FIG. 31 is a sequence diagram for describing a room door unlocking method according to a modification example (case 2).

Next, a method of unlocking the door of the room 3b according to a modification example will be described below with reference to FIGS. 30 and 31. FIGS. 30 and 31 are sequence diagrams for describing the method of unlocking the door of the room 3b according to the modification example. The door unlocking method according to the modification example is different from the door unlocking method according to the present embodiment in that the management server 4b executes a process of determining whether or not to unlock the door of the room 3b. In addition, in explaining the door unlocking method according to the modification example, the same processing as the processing of the door unlocking method of the present embodiment will not be repeatedly described.

As shown in FIG. 30, the processes of steps S100 to S104 are the same as the processes of steps S80 to S84 shown in FIG. 24, and accordingly no particular description thereof will be given. In addition, in the door unlocking method shown in FIG. 24, after the process of step S84, the management server 4b transmits the room reservation management table associated with the room 3b to the room 3b. On the other hand, in the door unlocking method according to the modification example, the management server 4b does not transmit the room reservation management table to the room 3b.

Then, as shown in FIG. 31, in step S105, the mobile terminal 2 acquires the IP address of the room 3b. Thereafter, the mobile terminal 2 transmits a door unlock signal to the door lock control system 30b through the communication network 5 by using the IP address of the mobile terminal 2 as a source address and the IP address of the room 3b as a destination address (step S106). Here, the process of step S105 is the same as the process of step S86 shown in FIG. 25. In addition, each process shown in FIG. 29 may be applied instead of the processes of steps S105 and S106.

Then, the door lock control system 30b transmits the door unlock signal and the information indicating the IP address of the mobile terminal 2 to the management server 4b through the communication network 5 (step S107). Thereafter, the management server 4b specifies a room ID of the room 3b based on the IP address of the door lock control system 30b (room 3b), which is a destination address, and the room management table. Then, the management server 4b reads out a room reservation management table of the room 3b based on the room ID of the room 3b. Thereafter, the management server 4b determines whether or not to allow the unlocking of the door 32b based on the room reservation management table of the room 3b stored in the storage device, the IP address of the mobile terminal 2, and the information regarding the current date and time (step S108). Specifically, the management server 4b determines whether or not the IP address corresponding to the user ID used to reserve the room 3b in the reserved time range including the current date and time matches the IP address of the mobile terminal 2. Here, when the two IP addresses match each other, the management server 4b determines that the unlocking of the door 32b is allowed, and then transmits a door unlock approval signal to the door lock control system 30b. On the other hand, when the two IP addresses do not match each other, the management server 4b determines that the unlocking of the door 32b is not allowed, and then transmits a door unlock disapproval signal to the door lock control system 30b (step S109).

Thereafter, when the signal transmitted from the management server 4b is a door unlock approval signal (YES in step S110), the control unit 31b of the door lock control system 30b transmits a door unlock signal to the door lock control circuit 36b. The door lock control circuit 36b unlocks the door 32b by driving the door lock mechanism 37b in response to the door unlock signal. In this manner, the door of the room 3b is unlocked (step S112). On the other hand, when the signal transmitted from the management server 4b is a door unlock disapproval signal (NO in step S110), the door lock control system 30b outputs a warning sound from the speaker 38b (step S111).

As described above, also in the method of unlocking the door of the room 3b according to the modification example, it is determined whether or not to allow the unlocking of the door 32b by using the IP address of the mobile terminal 2. For this reason, the mobile terminal 2 itself can be used as a key for unlocking the door of the room 3b. Therefore, the user U does not need to bring a physical key (card key or the like), and can unlock the door 32b only with the mobile terminal 2. In addition, without preparing a physical key corresponding to each room when using a plurality of rooms, the user U can unlock the doors of the plurality of rooms. Therefore, it is possible to provide a door unlocking method capable of improving the convenience of the user U and providing the user U with a new room sharing experience. In addition, in the door unlocking method according to the modification example, it is not necessary to store the room reservation management table in the room 3b, and the room 3b does not need to determine whether or not to unlock the door.

In addition, when the room reservation management table shown in FIG. 27 does not include IP address information, the management server 4b may execute the door unlock determination process defined in step S108 by referring to both the user management table and the room reservation management table. In this case, first, the management server 4b specifies the user ID of the user U corresponding to the IP address of the mobile terminal 2 based on the IP address of the mobile terminal 2 and the user management table. Thereafter, the management server 4b determines whether or not the user ID used to reserve the room 3b in the reserved time range including the current date and time matches the specified user ID based on the specified user ID and the room reservation management table.

While the embodiment of the present invention has been described above, the technical scope of the present invention should not be construed as being limited by the description of the present embodiment. The present embodiment is an example, and it is understood by those skilled in the art that various embodiments can be changed within the scope of the invention described in the claims. The technical scope of the present invention should be determined based on the scope of the invention described in the claims and the equivalent scope thereof.

In the present embodiment, an IP address, which is a network address corresponding to the Internet protocol, has been described as an example of the network addresses of the mobile terminal 2, the gate 3, the vehicle 3a, and the room 3b (door lock control system 30b). However, the network address is not limited to the IP address. For example, the network address may be a network address corresponding to a predetermined communication protocol other than the Internet protocol.

In addition, the method according to the present embodiment may be realized by a computer program. In this case, the computer program may be stored in a storage device, a ROM, or the like. In addition, the computer program may be stored in a computer-readable storage medium, such as a magnetic disk (for example, an HDD or a floppy disk), an optical disk (for example, a CD-ROM, a DVD-ROM, or a Blu-ray (registered trademark) disk), a magneto-optical disk (for example, an MO), or a flash memory (for example, an SD card, a USB memory, or an SSD). In this case, the computer program stored in the computer-readable storage medium may be stored in a storage device. In addition, the computer program stored in the storage device may be loaded onto the RAM, and then the processor may execute the program loaded onto the RAM.

This application appropriately incorporates the contents disclosed in the Japanese patent application (Japanese Patent Application No. 2019-042840) filed on Mar. 8, 2019.

The invention claimed is:

1. A door unlocking method, comprising:
    a step of transmitting a door unlock signal for making a request for unlocking of a door of an object, to the object by using an authenticated network address unique to a mobile device;
    a step of determining whether or not to allow the unlocking of the door based on a management table and the authenticated network address of the mobile device in response to reception of the door unlock signal; and
    a step of unlocking the door in response to a determination that the unlocking of the door is allowed,
    wherein the management table includes a plurality of pieces of network address information indicating a plurality of authenticated network addresses unique to a plurality of mobile devices each of which is associated with one of a plurality of users; and
    wherein authentication of the authenticated network address is determined based on a public key corresponding to a private key of the mobile terminal.

2. The door unlocking method according to claim 1, further comprising:
    a step of locking or unlocking the door according to communication between the mobile device and the object after the door is unlocked.

3. The door unlocking method according to claim 1,
    wherein the management table includes a user management table and a reservation management table for the object,
    the user management table includes a plurality of pieces of user identification information regarding a plurality of users and the plurality of pieces of network address information each of which is associated with one of the plurality of pieces of user identification information,
    the reservation management table includes the plurality of pieces of user identification information, and the step of determining whether or not to allow the unlocking of the door includes a step of specifying user identification information corresponding to the authenticated network address of the mobile device based on the user management table and the authenticated network address of the mobile device, a step of determining whether or not the object is reserved by the user corresponding to the user identification information based on the specified user identification information and the reservation management table, and a step of determining that the unlocking of the door is allowed in a case where the object is reserved by the user corresponding to the user identification information.

4. The door unlocking method according to claim 1, wherein the management table includes a reservation management table for the object, the reservation management table includes the plurality of pieces of network address information, and the step of determining whether or not to allow the unlocking of the door includes a step of determining whether or not the object is reserved by the user associated with the mobile device based on the reservation management table and the authenticated network address of the mobile device, and a step of determining that the unlocking of the door is allowed in a case where the object is reserved by the user associated with the mobile device.

5. The door unlocking method according to claim 1, wherein the management table is stored in a management server communicably connected to the object through a communication network, and the step of determining whether or not to allow the unlocking of the door is executed by the management server, and includes a step of receiving information regarding the authenticated network address of the mobile device from the object through the communication network.

6. The door unlocking method according to claim 1, wherein the management table is stored in the object, and the step of determining whether or not to allow the unlocking of the door is executed by the object.

7. The door unlocking method according to claim 1, wherein the object is a vehicle.

8. The door unlocking method according to claim 1, wherein the object is a room.

9. A non-transitory computer-readable storage medium storing a door unlocking program causing a computer to execute the door unlocking method according to claim 1.

10. A door unlocking system, comprising:

a mobile device associated with a user and having an authenticated network address unique to the mobile device; and an object communicably connected to the mobile terminal, wherein the door unlocking system is configured to execute the door unlocking method according to claim 1.

11. The door unlocking system according to claim 10, further comprising:

a management server connected to the object through a communication network.

* * * * *